(12) United States Patent
Sperry et al.

(10) Patent No.: US 11,667,451 B2
(45) Date of Patent: *Jun. 6, 2023

(54) APPARATUS AND METHOD FOR MAKING INFLATED ARTICLES

(71) Applicant: Sealed Air Corporation (US), Charlotte, NC (US)

(72) Inventors: Laurence Sperry, Newton, MA (US); James Corliss, Spofford, NH (US); Jason Lepine, Dedham, MA (US); Brian Murch, Needham, MA (US); Eric Kane, Lynn, MA (US); Ross Patterson, Boston, MA (US); Mark Salerno, Stratford, CT (US)

(73) Assignee: Sealed Air Corporation (US), Charlotte, NC (US)

( * ) Notice: Subject to any disclaimer, the term of this patent is extended or adjusted under 35 U.S.C. 154(b) by 187 days.

This patent is subject to a terminal disclaimer.

(21) Appl. No.: 17/147,516

(22) Filed: Jan. 13, 2021

(65) Prior Publication Data

US 2021/0130067 A1  May 6, 2021

Related U.S. Application Data

(60) Continuation of application No. 16/011,999, filed on Jun. 19, 2018, now Pat. No. 10,899,523, which is a
(Continued)

(51) Int. Cl.
*B29C 65/00* (2006.01)
*B65D 81/05* (2006.01)
(Continued)

(52) U.S. Cl.
CPC .......... *B65D 81/052* (2013.01); *B29C 65/223* (2013.01); *B29C 65/224* (2013.01);
(Continued)

(58) Field of Classification Search
CPC ... B29C 66/1122; B29C 66/71; B29C 66/723; B29C 66/8122; B29C 66/8167;
(Continued)

(56) References Cited

U.S. PATENT DOCUMENTS

| 2,262,493 A | 11/1941 | Guinzburg |
| 3,546,433 A | 12/1970 | Johnson |

(Continued)

FOREIGN PATENT DOCUMENTS

WO  01/74686 A2  10/2001

*Primary Examiner* — James D Sells
(74) *Attorney, Agent, or Firm* — Jon M. Isaacson

(57) ABSTRACT

A sealing device generally includes a rotatable support cylinder having an outer, circumferential surface and a heating element disposed about such surface and secured thereto such that the heating element rotates therewith. The heating element is coiled about the outer surface of the cylinder in the form of an overlapping helical pattern. Juxtaposed film plies may be sealed together by bringing the sealing device into rotational contact with the juxtaposed film plies and heating the heating element to a temperature sufficient to cause the film plies to seal together.

14 Claims, 19 Drawing Sheets

Related U.S. Application Data continuation of application No. 14/033,704, filed on Sep. 23, 2013, now Pat. No. 10,011,416, which is a division of application No. 11/786,631, filed on Apr. 12, 2007, now Pat. No. 8,567,159.

(51) Int. Cl.

| | | |
|---|---|---|
| *B29C 65/22* | (2006.01) | |
| *B29C 65/74* | (2006.01) | |
| *B31D 5/00* | (2017.01) | |
| *B29K 23/00* | (2006.01) | |
| *B29K 25/00* | (2006.01) | |
| *B29K 67/00* | (2006.01) | |
| *B29K 69/00* | (2006.01) | |
| *B29K 77/00* | (2006.01) | |
| *B29K 96/00* | (2006.01) | |
| *B29K 101/12* | (2006.01) | |
| *B29K 105/00* | (2006.01) | |
| *B29L 22/02* | (2006.01) | |

(52) U.S. Cl.
CPC .......... *B29C 65/226* (2013.01); *B29C 65/228* (2013.01); *B29C 65/229* (2013.01); *B29C 65/7457* (2013.01); *B29C 66/0044* (2013.01); *B29C 66/1122* (2013.01); *B29C 66/232* (2013.01); *B29C 66/3452* (2013.01); *B29C 66/439* (2013.01); *B29C 66/43129* (2013.01); *B29C 66/80* (2013.01); *B29C 66/8167* (2013.01); *B29C 66/81429* (2013.01); *B29C 66/81463* (2013.01); *B29C 66/81871* (2013.01); *B29C 66/83411* (2013.01); *B29C 66/83413* (2013.01); *B29C 66/83415* (2013.01); *B29C 66/83511* (2013.01); *B29C 66/8432* (2013.01); *B29C 66/8543* (2013.01); *B31D 5/0073* (2013.01); *B29C 65/225* (2013.01); *B29C 66/71* (2013.01); *B29C 66/723* (2013.01); *B29C 66/8122* (2013.01); *B29C 66/81261* (2013.01); *B29C 66/8223* (2013.01); *B29C 66/8224* (2013.01); *B29C 66/8242* (2013.01); *B29C 66/83417* (2013.01); *B29C 66/83513* (2013.01); *B29C 2793/0045* (2013.01); *B29K 2023/06* (2013.01); *B29K 2023/065* (2013.01); *B29K 2023/0608* (2013.01); *B29K 2023/0616* (2013.01); *B29K 2023/0625* (2013.01); *B29K 2023/0633* (2013.01); *B29K 2023/0641* (2013.01); *B29K 2023/08* (2013.01); *B29K 2023/083* (2013.01); *B29K 2023/12* (2013.01); *B29K 2025/00* (2013.01); *B29K 2025/06* (2013.01); *B29K 2067/00* (2013.01); *B29K 2069/00* (2013.01); *B29K 2077/00* (2013.01); *B29K 2096/005* (2013.01); *B29K 2101/12* (2013.01); *B29K 2105/0085* (2013.01); *B29K 2827/18* (2013.01); *B29L 2022/02* (2013.01); *B31D 2205/0052* (2013.01)

(58) Field of Classification Search
CPC .......... B29C 66/8242; B29C 66/83411; B29C 66/83413; B29K 2101/01; B29K 2101/12

USPC ........................................................ 156/145
See application file for complete search history.

(56) References Cited

U.S. PATENT DOCUMENTS

| | | |
|---|---|---|
| 3,575,757 A | 4/1971 | Smith |
| 3,596,428 A | 8/1971 | Young et al. |
| 3,660,189 A | 5/1972 | Troy |
| 3,703,430 A | 11/1972 | Rich |
| 3,713,930 A | 1/1973 | Levrini et al. |
| 3,735,551 A | 5/1973 | Pratt |
| 3,817,803 A | 6/1974 | Chappuis |
| 3,868,285 A | 2/1975 | Becker et al. |
| 3,938,298 A | 2/1976 | Sperry et al. |
| 4,017,351 A | 4/1977 | Murakami |
| 4,049,854 A | 9/1977 | Testone |
| 4,096,306 A | 6/1978 | Sperry et al. |
| 4,384,442 A | 5/1983 | Gotoh et al. |
| 4,847,126 A | 7/1989 | Tschantz et al. |
| 5,187,917 A | 2/1993 | Watkins et al. |
| 5,216,868 A | 6/1993 | Salerno et al. |
| 5,340,632 A | 8/1994 | Shomron et al. |
| 5,351,828 A | 10/1994 | Becker et al. |
| 5,376,219 A | 12/1994 | Sperry et al. |
| 5,581,983 A | 12/1996 | Murakami |
| 5,660,662 A | 8/1997 | Testone |
| 5,679,208 A | 10/1997 | Sperry et al. |
| 5,824,392 A | 10/1998 | Gotoh et al. |
| 5,857,571 A | 1/1999 | Tschantz et al. |
| 5,937,614 A | 8/1999 | Watkins et al. |
| 5,942,076 A | 8/1999 | Salerno et al. |
| RE36,501 E | 1/2000 | Hoover et al. |
| 6,195,966 B1 | 3/2001 | Shomron et al. |
| 6,209,286 B1 | 4/2001 | Perkins et al. |
| 6,322,044 B1 | 11/2001 | Vangedal-Nielsen |
| 6,410,119 B1 | 6/2002 | De Luca et al. |
| 6,460,313 B1 | 10/2002 | Cooper |
| 6,582,800 B2 | 6/2003 | Fuss et al. |
| 6,605,169 B2 | 8/2003 | Perkins et al. |
| 6,635,145 B2 | 10/2003 | Cooper |
| 6,651,406 B2 | 11/2003 | Sperry et al. |
| 6,659,150 B1 | 12/2003 | Perkins et al. |
| 6,682,622 B2 | 1/2004 | Matarasso |
| 6,696,135 B2 | 2/2004 | Simhaee |
| 6,804,933 B2 | 10/2004 | Sperry et al. |
| 6,952,910 B1 | 10/2005 | Loersch |
| 7,225,599 B2 * | 6/2007 | Sperry .................. B29C 66/439 53/553 |
| 7,389,626 B2 | 6/2008 | Sperry et al. |
| 7,497,066 B2 | 3/2009 | Calogero |
| 8,567,159 B2 * | 10/2013 | Sperry ................ B29C 66/3452 53/558 |
| 2002/0166788 A1 | 11/2002 | Sperry et al. |
| 2004/0206050 A1 | 10/2004 | Fuss et al. |
| 2005/0155326 A1 | 7/2005 | Thomas |
| 2005/0188659 A1 | 9/2005 | Lerner et al. |
| 2005/0202212 A1 | 9/2005 | Matarasso |
| 2005/0221059 A1 | 10/2005 | Matarasso |
| 2006/0090421 A1 | 5/2006 | Sperry et al. |
| 2006/0174589 A1 | 8/2006 | O'Dowd |
| 2006/0218880 A1 | 10/2006 | Sperry et al. |
| 2006/0289108 A1 | 12/2006 | McNamara et al. |

* cited by examiner

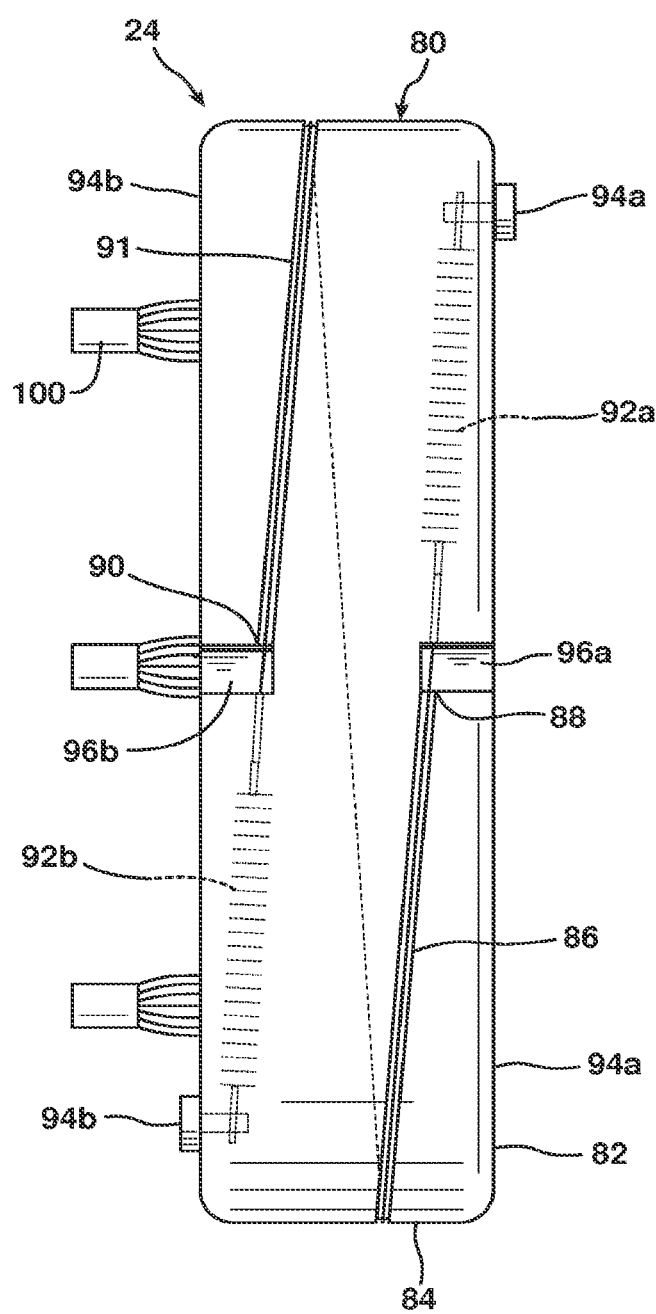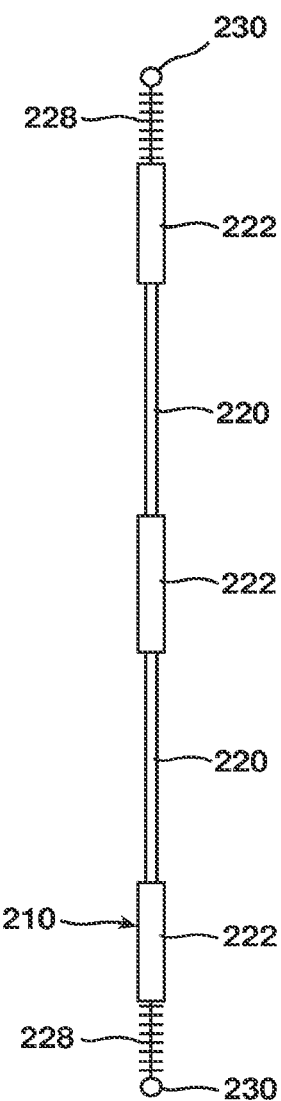

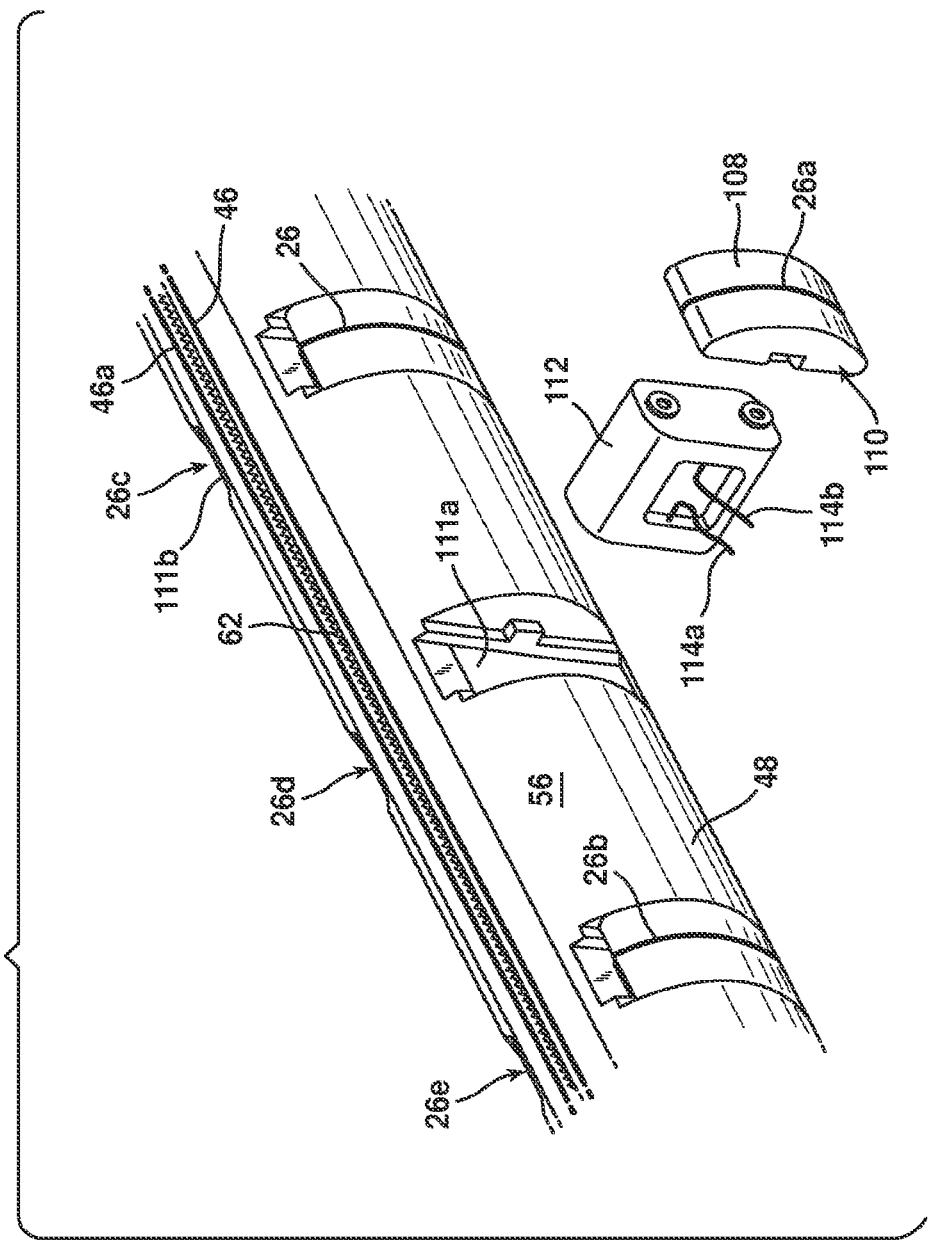

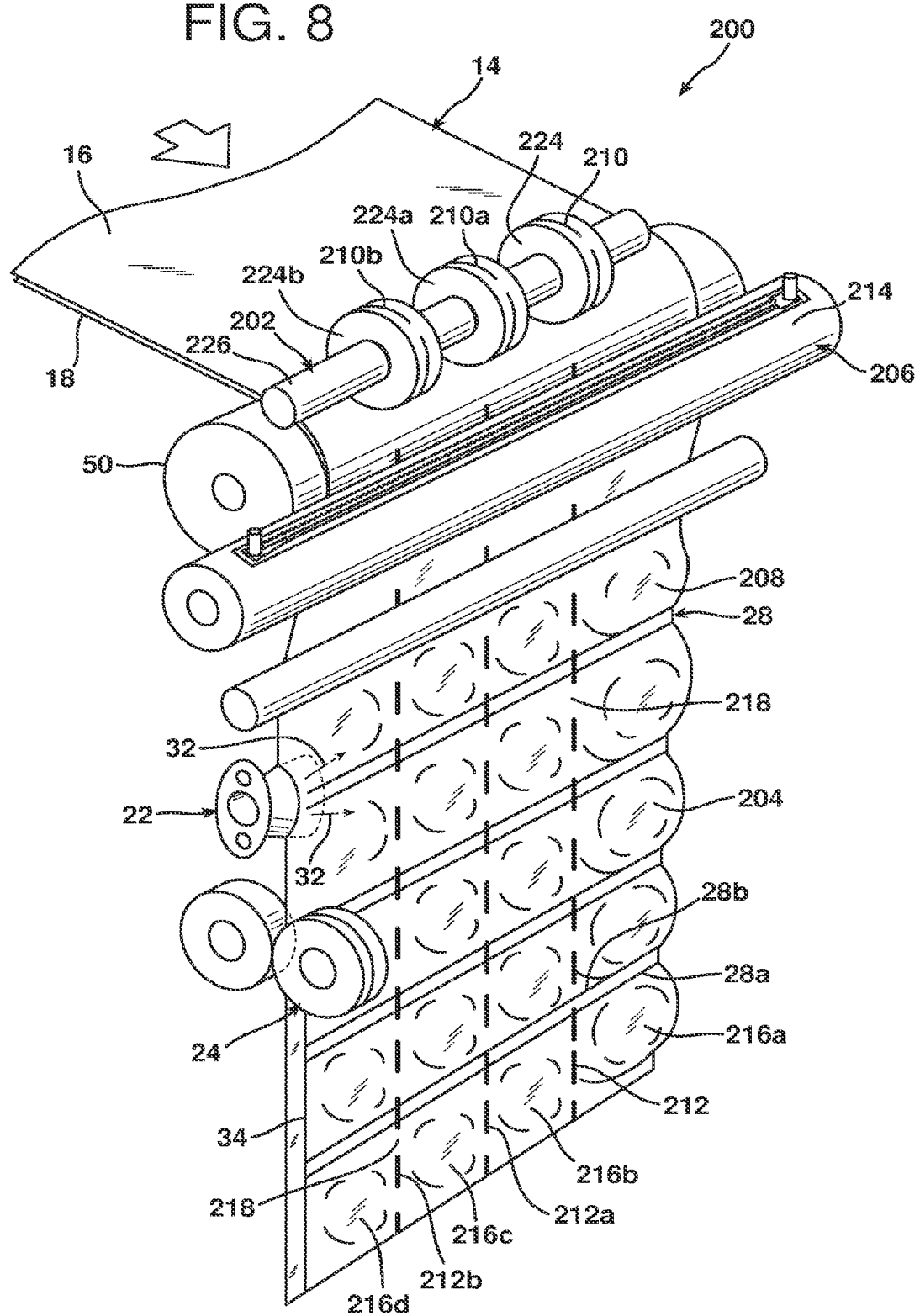

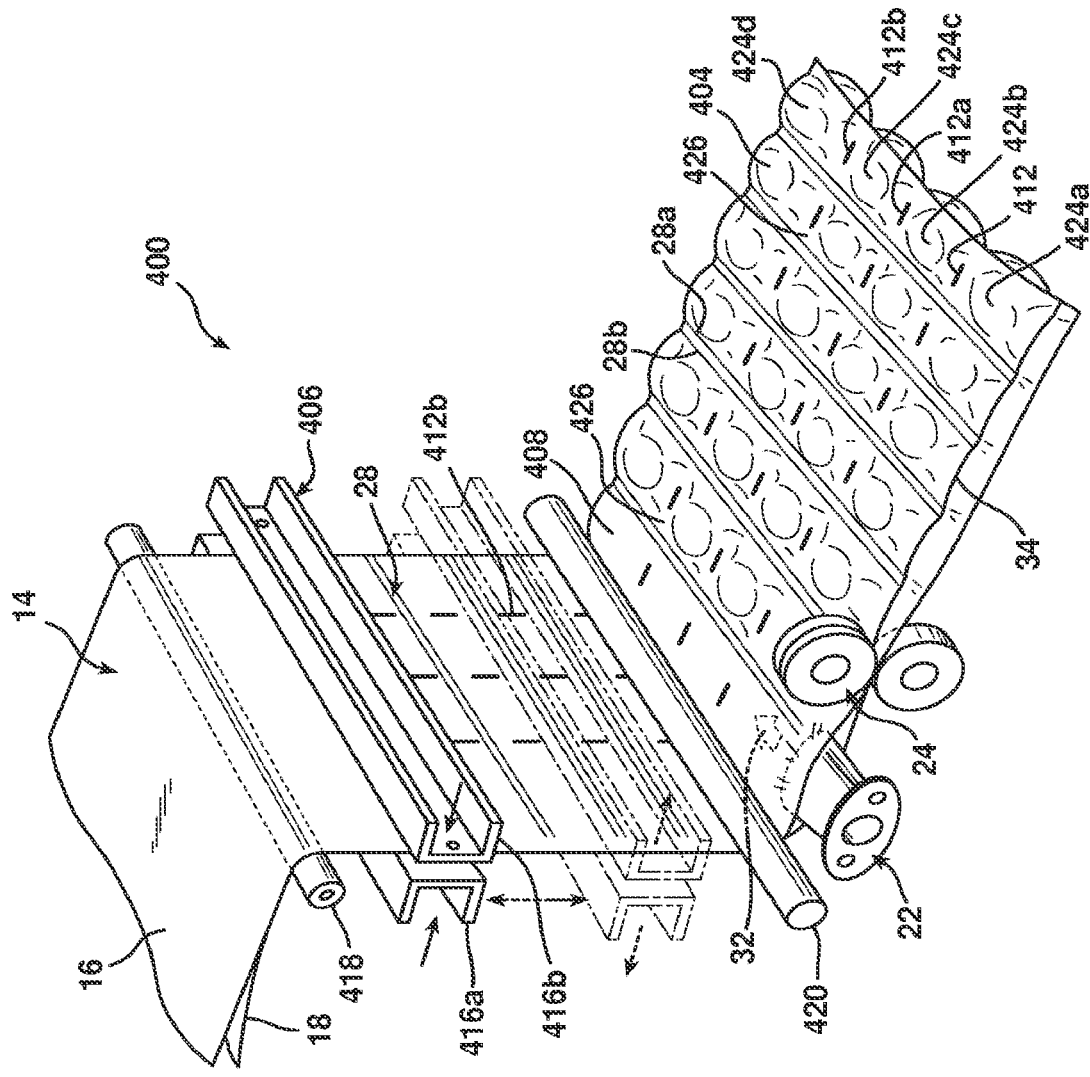

APPARATUS AND METHOD FOR MAKING INFLATED ARTICLES

This application is a continuation of U.S. patent application Ser. No. 16/011,999, filed Jun. 19, 2018, which is a continuation of U.S. patent application Ser. No. 14/033,704, filed Sep. 23, 2013, which is a divisional of U.S. patent application Ser. No. 11/786,631, filed Apr. 12, 2007, the disclosures of which are hereby incorporated by reference in their entirety.

BACKGROUND

The present invention relates to inflated containers and, more particularly, to an improved apparatus and process for producing gas-inflated containers having one or more compartments that fluidly communicate with one another.

Various apparatus and methods for forming inflated cushions, pillows, or other inflated containers are known. Inflated cushions are used to package items, by wrapping the items in the cushions and placing the wrapped items in a shipping carton, or simply placing one or more inflated cushions inside of a shipping carton along with an item to be shipped. The cushions protect the packaged item by absorbing impacts that may otherwise be fully transmitted to the packaged item during transit, and also restrict movement of the packaged item within the carton to further reduce the likelihood of damage to the item.

Many conventional inflatable cushions have the form of an inflated bag. While very useful in many packaging applications, such bag-type cushions cannot be wrapped around an object to be packaged.

Some inflatable cushions include a plurality of inflatable chambers, with partitions separating the individual chambers. The partitions allow the cushion to be wrapped about an object. However, such cushioning is generally of the pre-formed type, i.e., wherein the individual chambers are pre-fabricated at a factory or other non-packaging location. This increases the material cost to the packager, and often requires that several different types, e.g., sizes, styles, shapes, etc., of inflatable cushioning be kept by the packager in order to be able to adequately package objects having different sizes, shapes, etc. Not only does this further increase the material cost to the packager, but the necessity of changing cushioning types is cumbersome and requires a slow down in the rate at which objects can be packaged. Moreover, variations in the process of making pre-formed cushions can cause alignment and tracking problems in the inflation/sealing machines, resulting in poorly-inflated and/or poorly-sealed cushions, which may deflate prematurely or otherwise fail to protect the packaged product.

Accordingly, there is a need in the art for an apparatus and process for making, inflating, and sealing inflated containers that have one or more compartments in fluid communication with one another. This would allow such cushions to be formed at a packaging site and then wrapped about objects to be packaged.

SUMMARY

That need is met by the present invention, which, in one aspect, provides a sealing device, comprising: a. a rotatable support cylinder having an outer, circumferential surface; and b. a heating element disposed about at least a portion of the outer surface and secured thereto such that the heating element rotates therewith, the heating element being coiled about the outer surface in the form of an overlapping helical pattern, whereby, juxtaposed film plies may be sealed together by bringing the device into rotational contact with the juxtaposed film plies and heating the heating element to a temperature sufficient to cause the film plies to seal together.

The heating element may be coiled at least twice about the outer surface of the cylinder to form at least a double helical pattern.

The sealing device may further include a backing roller, wherein the rotatable support cylinder and the backing roller are structured and arranged to rotate against one another to create an area of tangential contact therebetween, which exerts a rotational compressive force on the film plies.

The sealing device may further include a drive mechanism to power the rotation of at least one of the support cylinder and the backing roller.

The film plies may be bonded together with a series of transverse seals, and the sealing device may produce a discontinuous series of longitudinal seals that intersect the transverse seals.

Another aspect of the invention is directed towards an apparatus for making inflated containers from a film web having two juxtaposed film plies, comprising: a. a first sealing device for producing a series of transverse seals that bond the film plies together; b. an inflation assembly for directing gas between the film plies; and c. a second sealing device for producing a discontinuous series of longitudinal seals that bond the film plies together and intersect the transverse seals to enclose the gas between the film plies to thereby form inflated containers, the second sealing device comprising: 1) a rotatable support cylinder having an outer, circumferential surface, and 2) a heating element disposed about at least a portion of the outer surface and secured thereto such that the heating element rotates therewith, the heating element being coiled about the outer surface in the form of an overlapping helical pattern, whereby, the longitudinal seals are formed by bringing the second sealing device into rotational contact with the juxtaposed film plies and heating the heating element to a temperature sufficient to cause the film plies to seal together.

A further aspect of the invention pertains to a method for making inflated containers from a film web having two juxtaposed film plies, comprising: a. producing a series of transverse seals that bond the film plies together; b. directing gas between the film plies; and c. producing a discontinuous series of longitudinal seals that bond the film plies together and intersect the transverse seals to enclose the gas between the film plies to thereby form inflated containers, wherein the longitudinal seals are formed by 1) bringing a sealing device into rotational contact with the juxtaposed film plies, the sealing device comprising a heating element coiled about at least a portion of an outer surface of a rotatable support cylinder in an overlapping helical pattern and secured thereto such that the heating element rotates therewith, and 2) heating the heating element to a temperature sufficient to cause the film plies to seal together.

These and other aspects and features of the invention may be better understood with reference to the following description and accompanying drawings.

BRIEF DESCRIPTION OF THE DRAWING

FIG. 5 is an elevational view of a longitudinal sealing roller, which may be used in place of the sealing roller 70 as shown in FIGS. 1-2;

FIG. 6 is a more detailed view of the sealing roller 48 as shown in FIG. 3;

FIG. 8 is a perspective view of the apparatus shown in FIG. 7;

FIG. 9 is a plan view of intermediate sealing element 210 as shown in FIG. 8;

FIG. 13 is a perspective view of the apparatus shown in FIG. 12;

FIG. 14B is similar to FIG. 14A, but illustrates an alternative arrangement of the sealing elements on component 416a;

DETAILED DESCRIPTION

Figure 1:
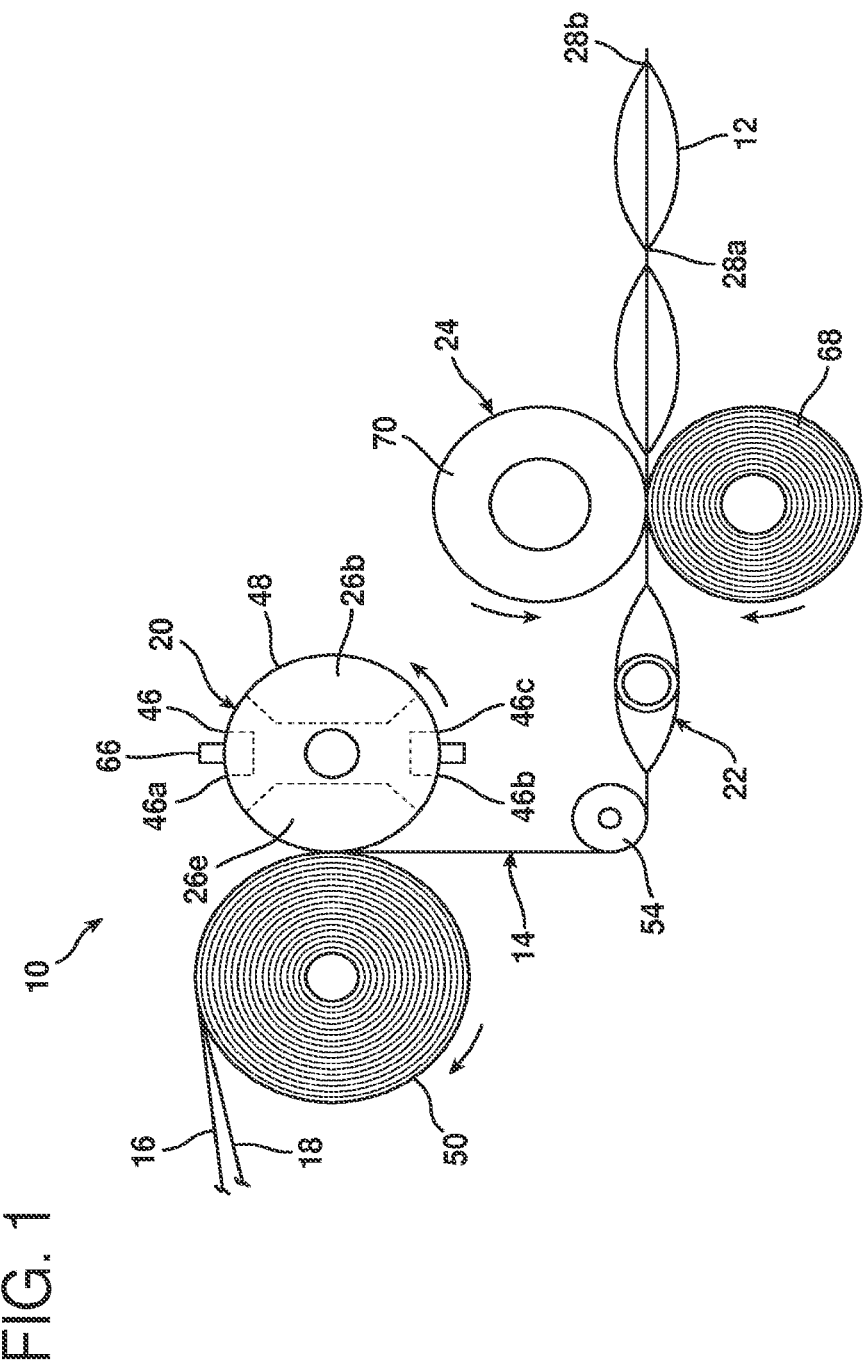
FIG. 1 is a schematic elevational view of an apparatus for forming inflated containers in accordance with the present invention.
Figure 2:
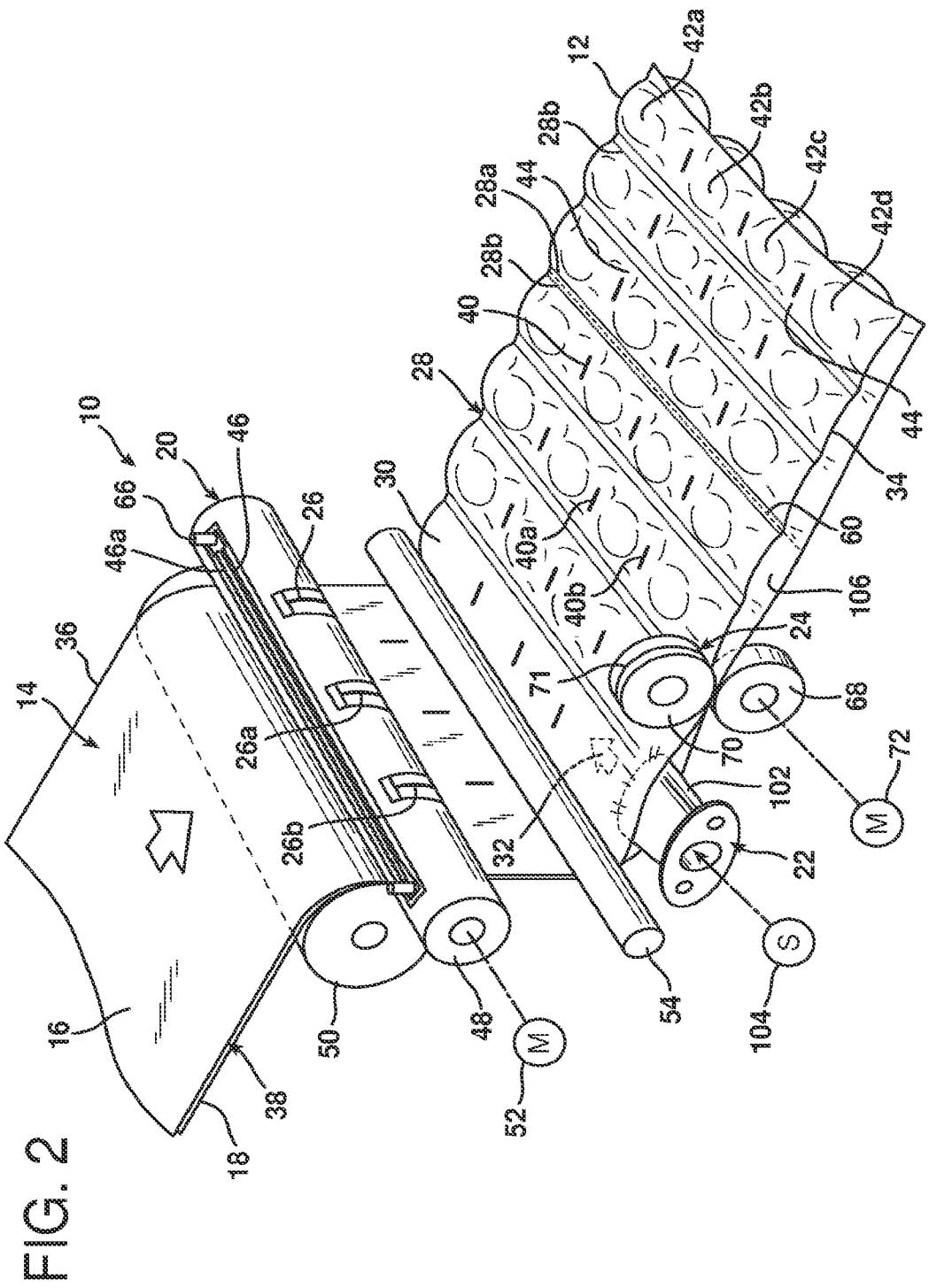
FIG. 2 is a perspective view of the apparatus shown in FIG. 1.

Referring to FIGS. 1-2, there is shown an apparatus 10 in accordance with the present invention for making inflated containers 12 from a film web 14 having two juxtaposed film plies 16 and 18. Inflated containers 12 may be used as cushions, e.g., for packaging and protecting items during shipment and storage. Other uses for the inflated containers are also envisioned, e.g., as floatation devices or decorative objects.

As shown, apparatus 10 includes a first sealing device 20, an inflation assembly 22, a second sealing device 24, and at least one intermediate sealing element 26.

First sealing device 20 produces a series of transverse seals 28 that bond the juxtaposed film plies 16, 18 together. Such seals are generally oriented in a direction that is substantially transverse, i.e., at an angle, to the direction of movement of film web 14 along its travel path through apparatus 10. Pre-inflated containers 30 may thus be formed between pairs of the transverse seals 28. Such transverse seals 28 will also be components of the completed, inflated containers 12. For ease of reference, the 'upstream' transverse seal of each container 12, 30 is designated 28a while the 'downstream' seal is designated 28b.

Inflation assembly 22 directs gas, indicated by arrow 32, between film plies 16, 18 and into the pre-inflated containers 30 as shown.

Second sealing device 24 produces one or more longitudinal seals that bond the film plies 16, 18 together. In the presently-illustrated embodiment, second sealing device 24 produces a single, continuous longitudinal seal 34. In other embodiments, the second sealing device may produce a discontinuous series of longitudinal seals as disclosed, e.g., in U.S. Ser. No. 11/099,289, published under Publication Number US-2006-0218880-A1, the disclosure of which is hereby incorporated by reference herein.

In order to form inflated containers 12, apparatus 10 forms transverse seals 28 and longitudinal seal(s) 34 in such a manner that the seals 28, 34 intersect, thereby enclosing gas 32 between film plies 16, 18.

In the illustrated embodiment, film web 14 is a 'center-folded' web having a closed longitudinal edge 36 and an opposing open longitudinal edge 38. Open longitudinal edge 38 allows gas 32 to be directed between film plies 16, 18 and into the pre-inflated containers 30. Closed longitudinal edge 36 may be formed by folding film web 14 at or near its longitudinal center, i.e., center-folding the web, such that each of the film plies 16, 18 have substantially the same dimension. Suitable center-folding devices and methods are well-known in the art. Center-folding may be performed at any desired time, e.g., shortly after the film is produced and/or just before being wound onto a supply roll (not shown) for later use with apparatus 10. Alternatively, a center-folding device may be added to or used with apparatus 10 at a location upstream of the apparatus.

As a further alternative, separate film plies 16, 18 may be juxtaposed and sealed together along adjacent longitudinal side edges, e.g., via heat-sealing, to form closed longitudinal edge 36.

As another alternative, film web 14 may be a flattened tube, i.e., with two opposing folded/closed longitudinal edges joining the juxtaposed film plies 16, 18. In other words, when film web is a tube, both of longitudinal edges 36, 38 are closed, e.g., folded or sealed. In one embodiment, one of the longitudinal edges may be slit at some point 'upstream' of inflation assembly 22 to form open edge 38. In another embodiment, inflation may be effected by inserting one or more needles into the tube, injecting air through the needles, then sealing the resultant needle holes to enclose gas within the tube. Sealing of the needle holes may be accomplished by forming a pair of transverse seals, with one transverse seal formed upstream of the needles holes and the second transverse seal formed downstream of the needle holes, thereby isolating the needle holes between the pair of transverse seals. In this embodiment, second sealing device 24 would not be needed and could be omitted from the apparatus. Further details regarding this means for forming inflated containers from a tube are set forth in U.S. Pat. No. 5,942,076, the disclosure of which is hereby incorporated by reference herein.

Because apparatus 10 inflates the film web 14 from one edge thereof, a variety of web widths may be accommodated by the apparatus, thereby making inflated containers having a variety of widths ranging, e.g., from 4 inches to 20 inches.

Accordingly, when second sealing device 24 makes longitudinal seal 34, gas 32 is enclosed between: film plies 16, 18; a pair 28a, b of transverse seals; closed longitudinal edge 36; and longitudinal seal 34. In this manner, each pre-inflated container 30 is converted into an inflated container 12.

In accordance with the present invention, apparatus 10 further includes at least one intermediate sealing element 26 for producing one or more intermediate seals 40 within each inflated container 12. In the presently-illustrated embodiment, apparatus 10 includes three intermediate sealing elements 26, 26a, and 26b, which form three intermediate seals 40, 40a, and 40b in each inflated container 12. As shown, the intermediate seals 40-40b partition the inflated containers 12 into two or more compartments 42a-42d, and provide at least one flow passageway 44 between at least two of the compartments to allow such compartments to fluidly communicate with one another (see also FIG. 4).

Accordingly, unlike longitudinal seal 34, which intersects the transverse seals 28a, b for each container to enclose gas 32 therein, the intermediate seals 40-40b preferably do not intersect both transverse seals. In this manner, at least one gap or space exists between the intermediate seals and a transverse seal, which provides the flow passageways 44 between each of the compartments 42a-42d. In the illustrated embodiment, the intermediate seals 40 intersect neither transverse seal 28a nor 28b so that two flow passageways 44 are associated with each intermediate seal 40-40b: one flow passageway 44 is positioned between each intermediate seal and each upstream transverse seal 28a and another flow passageway is located between each intermediate seal and each downstream transverse seal 28b.

Each of intermediate sealing elements 26-26b may provide such intermediate seals 40-40b by forming a series of longitudinally arrayed 'skip seals,' which are longitudinally discontinuous, i.e., spaced from one another in the longitudinal direction, and positioned between each of the transverse seals 28a, b, such that each skip seal becomes an intermediate seal. This may be accomplished, as illustrated, by fashioning first sealing device 20 such that it comprises both a transverse sealing element 46 and intermediate sealing elements 26-26b. Further, first sealing device 20 may comprise at least one rotary component, such as sealing roller 48, on the surface of which the transverse and intermediate sealing elements may be mounted as shown.

In the presently described embodiment, first sealing device 20 may include a plurality of transverse sealing elements, including transverse sealing elements 46, 46a, 46b, and 46c. As shown, the transverse sealing elements may be paired, e.g., with elements 46, 46a paired together and elements 46b, 46c paired together. Further, each pair may be positioned on the sealing roller 48 with any desired degree of angular spacing between each pair, e.g., with 180° spacing as shown. Similarly, each of intermediate sealing elements 26, 26a, and 26b may have an opposing counterpart sealing element 26c, 26d, and 26e, respectively (only element 26e shown), on sealing roller 48, e.g., at an angular spacing of 180° as illustrated. In this manner, when rotary component 48 rotates, the transverse sealing elements and intermediate sealing elements intermittently contact web film 14 to alternatingly form transverse seals 28 and intermediate seals 40 as shown.

Apparatus 10 may further include a mechanism that conveys the film web 14 along a path of travel through the apparatus as shown. Such conveyance mechanism may be provided by including in first sealing device 20 a further rotary component, e.g., backing roller 50. The sealing and backing rollers 48, 50 may be relatively positioned such that they rotate against one another to create a 'nip,' or area of tangential contact, therebetween, which exerts a rotational compressive force on film web 14. As such, sealing and backing rollers 48, 50 may be used to convey the film web through apparatus 10 when the rollers rotate in the direction indicated by the rotational arrows in FIG. 1, which thereby drives the film web in a forward direction as indicated by the linear arrow in FIG. 2. Thus, as a further component of the conveyance mechanism, the rotation of one or both rollers 48, 50 may be powered by a suitable drive mechanism.

For example, a motor 52 may be included, which is mechanically linked to sealing roller 48 as shown schematically in FIG. 2. In such configuration, sealing roller 48 serves as a 'drive roller' while backing roller 50 is a 'driven roller,' i.e., passively driven by drive/sealing roller 48. Alternatively or in addition, a motor may similarly be linked to backing roller 50 to directly drive the rotation thereof.

The 'path of travel' (or 'travel path') is simply the route that film web 14 follows as it is conveyed through apparatus 10. Thus, in the presently illustrated embodiment, film web 14 is conveyed through apparatus 10 along a travel path that encounters the following components, in the following order: first sealing device 20, guide roller 54, inflation assembly 22, and second sealing device 24. The foregoing order is in no way intended to be limiting, and is merely set forth for illustration. Numerous other configurations are possible, some of which are described below. Guide roller 54 may be included as necessary, e.g., to place film web 14 in alignment with inflation assembly 22. Various additional conventional film-guide and film-drive devices may be included as desired.

Film web 14 may be supplied, e.g., from a supply roll (not shown) that is positioned, e.g., above or beneath the components depicted in FIGS. 1-2 and mounted, e.g., to the same frame or housing to which the other components of apparatus 10 are mounted. Alternatively, the film web may be supplied from a separate film-supply mechanism, such as a cart-mounted roll or a folded stack housed in a box.

Accordingly, it may be appreciated that the rotary component, i.e., sealing roller, 48 of first sealing device 20 is adapted to bring the transverse and intermediate sealing elements 46, 26 into rotational contact with film web 14 as the web is conveyed along its travel path through apparatus 10. In this manner, first sealing device 20 forms the transverse seals 28 and intermediate seals 40 as the film web is conveyed along such travel path.

Specifically, it may be seen in FIGS. 1-2 that as sealing roller 48 continues to rotate in the direction shown, transverse sealing element 46a will next be brought into contact with film web 14, followed by transverse sealing element 46, to produce respective transverse seals 28a and 28b in the relatively closely-spaced, paired relationships illustrated in FIG. 2. As the roller 48 continues its rotation, intermediate sealing elements 26, 26a, and 26b will contact the film web, thereby producing respective intermediate seals 40, 40a, and 40b, which are spaced and positioned just 'upstream' from the just-formed transverse seal 28b. Upon further rotation of roller 48, transverse sealing elements 46c and 46b will make another pair of respective transverse seals 28a and 28b. The resultant transverse seal 28a made by transverse sealing element 46c thus completes the pre-inflated container 30 begun by the formation of transverse seal 28b by transverse sealing element 46 on the previous half rotation of sealing roller 48. Similarly, the transverse seal 28b made by transverse sealing element 46b will begin the formation a new pre-inflated container 30, to which a set of intermediate seals 40, 40a, and 40b are added by intermediate sealing elements 26c-26e (only element 26e shown) upon further rotation of sealing roller 48.

Accordingly, although apparatus 10 produces the transverse and intermediate seals on an intermittent and alternating basis, the rotation of the sealing and backing rollers 48, 50 may be continuous such that the film web may move continuously, i.e., without stoppage or interruption, through apparatus 10.

The transverse, intermediate, and longitudinal seals 28, 34, and 40, respectively, may be any type of seal that bonds two film plies together, such as a heat seal, adhesive seal, cohesive seal, etc., with heat seals being preferred. A heat seal, or heat weld, may be formed when the film plies 16, 18 are brought into contact with one another and sufficient heat is applied to one or both films in one or more predetermined regions such that at least a portion of each heated film region becomes molten and intermixes with the other heated region. Upon cooling, the heated regions of the two film plies become bound together. The heated regions are thereby transformed into heat seals, which may serve as seals 28, 34, and 40 as shown in FIG. 2.

Figure 3:
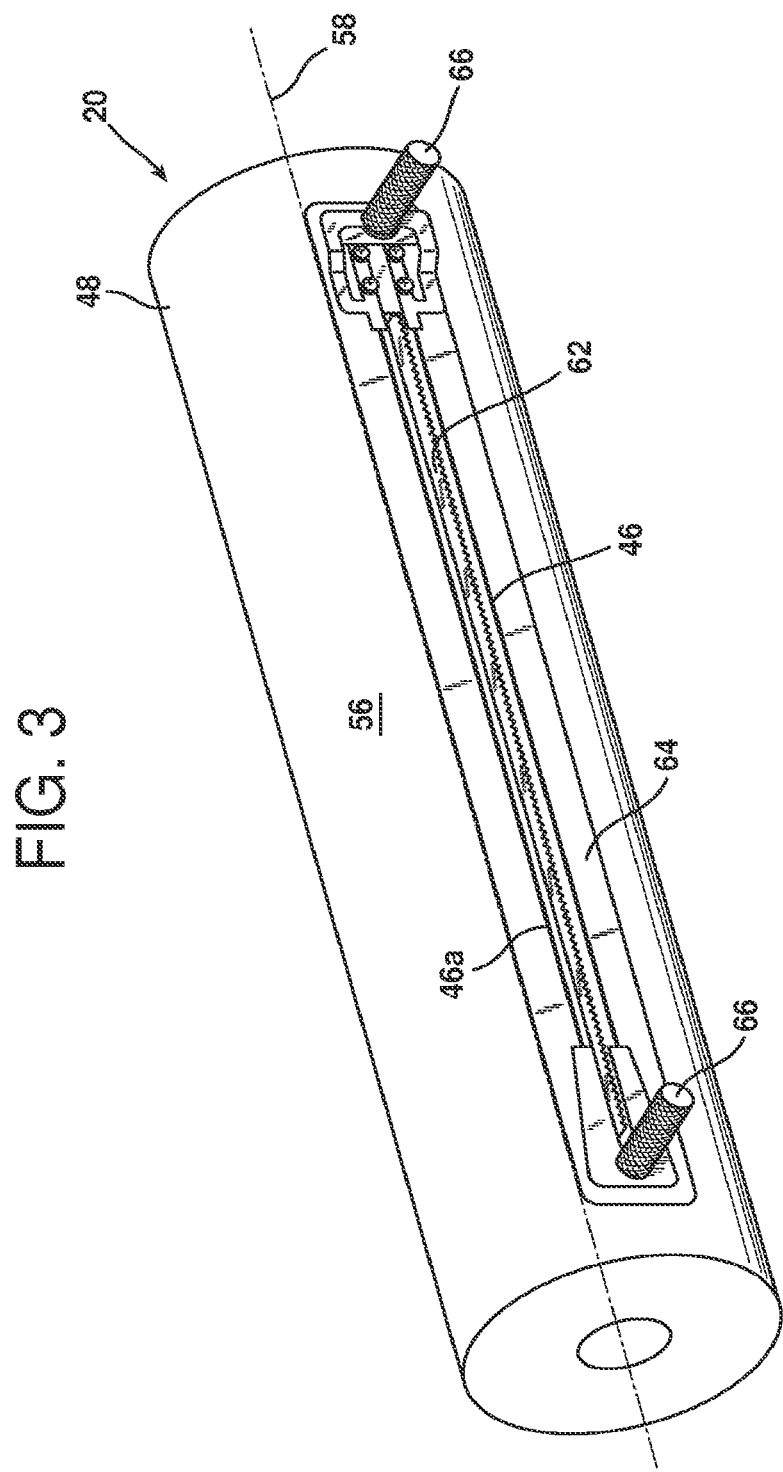
FIG. 3 is an enlarged, perspective view of the sealing roller 48 as shown in FIG. 2.

Referring now to FIG. 3, a suitable embodiment for first sealing device 20 will be described in further detail. The rotary 'sealing roller' component 48 of device 20 may comprise a rotatable support cylinder having an outer, circumferential surface 56 and an axis 58 about which the cylinder rotates. Transverse sealing elements 46 and 46a may be affixed to the outer surface 56 in substantial alignment with axis 58. A second pair of transverse sealing elements, e.g., 46b and 46c, or even a third or fourth pair may similarly be affixed to the outer surface 56, at any desired degree of spacing from elements 46 and 46a. For clarity, only transverse sealing elements 46 and 46a are shown in FIG. 3; the intermediate sealing elements 26 and other transverse sealing elements have been omitted from this view.

Transverse sealing elements 46 and 46a may be resistive elements, which produce heat when electricity is supplied thereto (source not shown), and can have any desired shape or configuration. As shown, elements 46 and 46a are in the form of linear, substantially parallel wires, which produce a pair of substantially parallel transverse heat seals 28a, b in film web 14 when elements 46/46a are brought into contact therewith, e.g., as illustrated in FIGS. 1-2. In this manner, first sealing device 20 forms transverse seals 28a, b when sealing roller 48 is brought into rotational contact with one of film plies 16 or 18, and the sealing elements 46/46a are heated to a sealing temperature sufficient to cause the film plies to seal together. When sealing roller 48 is configured as shown in FIGS. 1-2, i.e., with two pairs of sealing elements 46/46a and 46b/46c arrayed on the surface 56 of roller 48, then two pairs 28a, b of transverse seals 28 are created with each rotation of roller 48. Similarly, three pairs of sealing elements on roller 48 would produce three pairs 28a, b of transverse seals with each rotation, etc.

As an alternative or in addition to the substantially linear seals 28 that are depicted in FIG. 2, other shapes and patterns may also be formed, such as substantially non-linear seals, e.g., undulating seals that produce a pattern of interconnected bubbles, seals with a combination of linear and non-linear segments (described below), 'zig-zag' seal patterns, etc.

If necessary or desired, a heat transfer medium may be placed between the transverse sealing elements 46/46a and the film web 14, such as a coating of PTFE, e.g., TEFLON tape, polyester, or other material capable of withstanding the heat from the sealing members and transferring the same to the film web in an amount sufficient to create seals 28.

Figure 4:
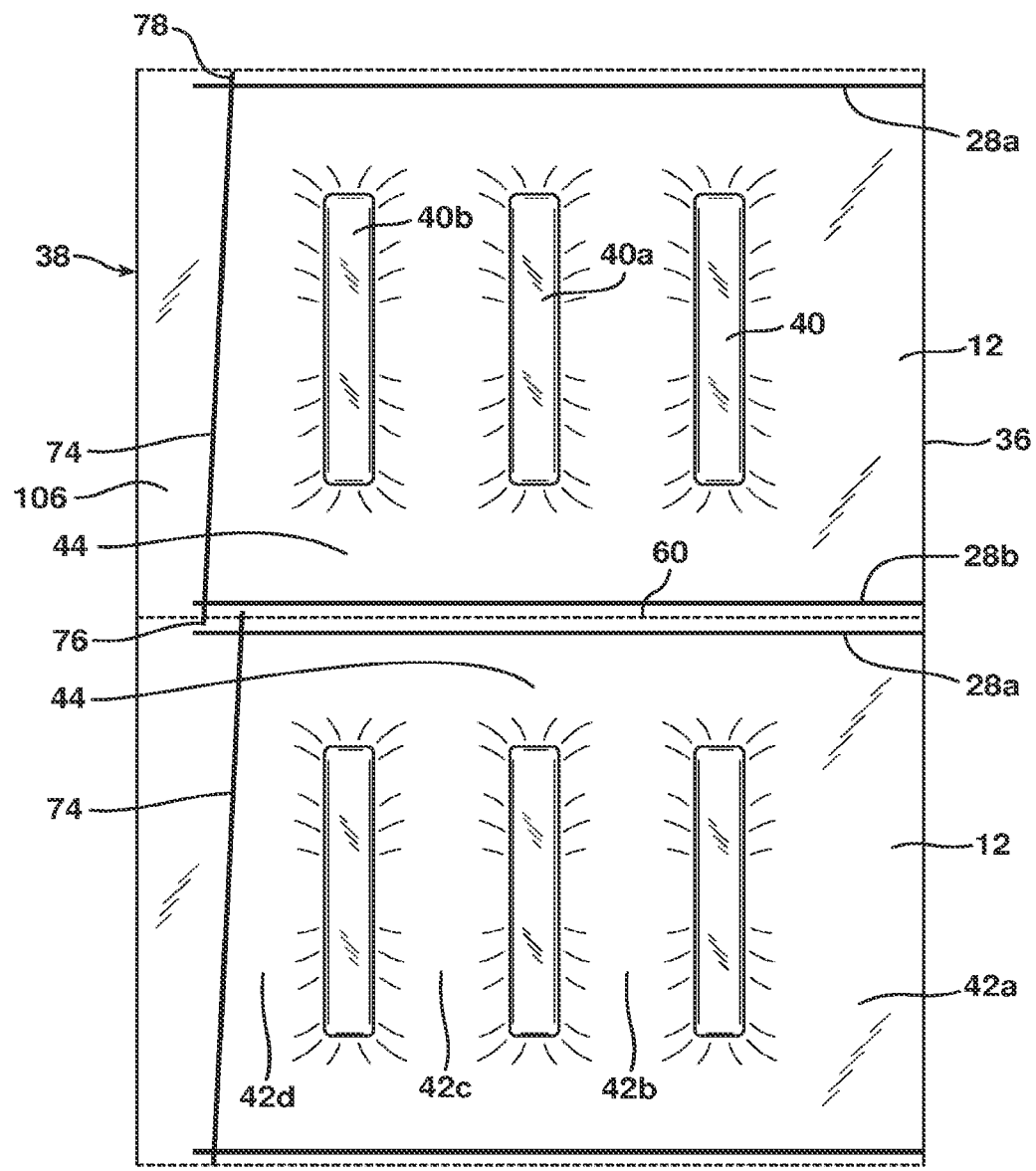
FIG. 4 is a plan view of inflated containers made from a modified version of the apparatus shown in FIG. 1, wherein a longitudinal sealing roller 80 as shown in FIG. 5 is used in place of the sealing roller 70 as shown in FIGS. 1-2.

Upon completion of the individual inflated containers 12, their separation from one another and/or from film web 14 may be facilitated by including one or more lines of weakness 60 between adjacent articles (see FIGS. 2 and 4; only one line of weakness 60 shown). Accordingly, apparatus 10 may advantageously include means for producing such lines of weakness. This may be accomplished by adapting first rotary sealing device 20 to produce lines of weakness 60 between pre-inflated containers 30, e.g., either between each container or between groups of two or more containers as desired. For example, a device for creating lines of weakness 60 may be incorporated into or onto, e.g., affixed to, sealing roller 48 at outer surface 56 thereof.

A suitable device for creating lines of weakness 60 is a perforation blade 62, which produces a perforation-type line of weakness. As shown in FIG. 3, perforation blade 62 may be incorporated as a component of sealing roller 48. Blade 62 may be serrated as shown to produce a row of perforations in film web 14, which form lines of weakness 60 in film web 14 to allow easy tearing therethrough.

In some embodiments, perforation blade 62 (or other type of perforation device) may be disposed between transverse sealing elements 46, 46a as shown. Such positioning conveniently facilitates the placement of line of weakness 60 between transverse seals 28a, b of adjacent containers 12. Moreover, the creation of a line of weakness 60 in this manner occurs simultaneously with the creation of seals 28a, b. However, line of weakness 60 could also be formed in a separate step, e.g., with a perforation device that is separately positioned and independently operated from first rotary sealing device 20 if desired.

If desired, each container 12 may be separated by a line of weakness 60. Alternatively, fewer numbers of weakness lines 60 may be employed such that not every container is separated from an adjacent container by a line of weakness.

For example, a perforation blade could be independently operated and/or separately positioned to create lines of weakness between any desired number of containers, e.g., between every other container, every third container, every tenth container, etc. This may be desirable when making complex cushions containing groups of two or more inflated articles.

As a further feature that may be employed with respect to sealing roller 48, transverse sealing elements 46, 46a, and optionally perforation blade 62, may be mounted together as an integral unit on the sealing roller. As shown in FIG. 3, this may be accomplished by mounting the sealing elements 46, 46a and perforation blade 62 on a support bar 64. Support bar 64, in turn, may be affixed to the surface 56 of sealing roller 48. If desired, the support bar may be removably affixed to the sealing roller, such that the entire assembly may be removed and replaced as an integral unit. In this manner, when the sealing elements and/or perforation blade become worn, the whole assembly may be removed and replaced as a unit without the need to replace individual components, thereby facilitating in-field repairs.

The support bar 64 may be attached to sealing roller 48 via any suitable means, such as a pair of retaining pins 66, which may be connected to and extend through the support bar and be retained in corresponding sockets (not shown) in sealing roller 48, e.g., via friction fit, to provide mechanical attachment of the bar to the roller. The portion of pins 66 extending from support bar 64, as shown in FIG. 3, provide grasping surfaces to facilitate the manual removal and replacement of the integral 'sealing assembly,' i.e., support bar 64 with transverse sealing elements 46, 46a and perforation blade 62 mounted thereto. Further, when sealing elements 46, 46a are wires or other devices that generate heat by providing resistance to the flow of electrical current therethrough, retaining pins 66 may also be used to provide electrical connection for the sealing elements 46, 46a, i.e., by providing electrical communication between a source of electricity (not shown) and the sealing elements. A suitable type of pin in this regard is known as a "banana plug." Thus, for example, a carbon-brush commutator and slip ring may be used to transfer electricity from a static source, e.g., a wire from a wall socket, to the rotating sealing elements, whereby the carbon brushes are stationary and transfer electrical current to the slip ring, which is attached to and rotates with sealing roller 48. The slip ring, in turn, is in electrical communication with the pins 66.

Further details regarding the first sealing device 20 as shown in FIG. 3 are disclosed in the above-incorporated U.S. Ser. No. 11/099,289, published under Publication Number US-2006-0218880-A1.

As noted above, second sealing device 24 produces longitudinal seal 34 between film plies 16, 18, which intersects pair 28a, b of transverse seals 26 to enclose gas 32 within pre-inflated containers 30. In this manner, the containers 30 are converted into inflated containers 12.

As shown in FIGS. 1-2, second sealing device 24 may include a rotary component, such as sealing roller 70, and a backing roller 68. As with the first sealing device 20, the sealing and backing rollers 70, 68 of device 24 rotate against one another to create a 'nip,' or area of tangential contact, therebetween, which exerts a rotational compressive force on film web 14. As such, sealing and backing rollers 70, 68 may, in addition or as an alternative to first sealing device 20, facilitate the conveyance of the film web through apparatus 10 when the rollers rotate in the direction indicated by the rotational arrows. The rotation of one or both of rollers 70, 68 may be powered by a suitable drive mechanism, e.g., motor 72, as shown schematically in FIG. 2.

Longitudinal seal 34 may be any type of seal that bonds two film plies together, such as a heat seal, adhesive seal, cohesive seal, etc., with heat seals being preferred as noted above. Longitudinal seal 34 is generally oriented in a direction that is substantially parallel to the direction of movement of film web 14 along its travel path through apparatus 10. As shown in FIG. 2, seal 34 may be a continuous longitudinal seal, i.e., a substantially linear, unbroken seal, which is interrupted only when second sealing device 24 is caused to stop making the seal. Thus, sealing roller 70 may be heated in any suitable manner to produce a continuous longitudinal seal 34 as shown. For example, the second sealing device 24 may include a longitudinal sealing element 71, e.g., an electrically-heated resistive sealing element, such as a band or wire. Further, sealing roller 70 may be adapted to bring such longitudinal sealing element 71 into rotational contact with film web 14 to form longitudinal seal 34 as the web is conveyed along its path of travel. As shown, this may be accomplished by mounting the sealing element 71 on the circumferential surface of sealing roller 70 that rotates against the film web.

As an alternative to a continuous longitudinal seal 34 as shown in FIG. 2, second rotary sealing device 24 may be adapted to produce a discontinuous series of longitudinal seals 74, as shown in FIG. 4. When this embodiment is employed, the first and second sealing devices 20, 24 are synchronized such that each longitudinal seal 74 intersects the transverse seals 28a, b that define each pre-inflated container 30, thereby enclosing gas 32 therewithin to complete the formation of the inflated containers 12. Thus, leading end 76 of each discontinuous longitudinal seal 74 intersects the 'downstream' transverse seal 28b of each container while the trailing end 78 intersects the 'upstream' transverse seal 28a of each container, as shown in FIG. 4.

A discontinuous series of longitudinal seals 74 will result when sealing roller 80, as depicted in FIG. 5, is used in place of sealing roller 70 in apparatus 10, i.e., as an alternative sealing roller in second sealing device 24. Sealing roller 80 may, as shown in FIG. 5, include a rotatable support cylinder 82 having an outer, circumferential surface 84, and a longitudinal sealing element 86 disposed about at least a portion of the outer surface 84. Sealing element 86 may be secured to cylinder 82 such that the sealing element rotates with the cylinder.

Longitudinal sealing element 86 is preferably a resistive element, which produces heat when electricity is supplied thereto (source not shown), and can have any desired shape or configuration. As shown, element 86 is in the form of a wire. When sealing element 86 is a resistive element, support cylinder 82 may be formed from any material that is capable of withstanding the temperatures generated by the sealing element. Such materials include metal, e.g., aluminum (preferably electrically-insulated); high-temperature-resistant polymers, e.g., polyimide; ceramics; etc. A groove 91 may be provided in outer surface 84 to accommodate sealing element 86 and keep it in proper position on the outer surface of cylinder 82.

If desired or necessary, a release layer/heat transfer medium may be fastened to outer surface 84 such that it is positioned between longitudinal sealing element 86 and the film web 14, such as a coating of PTFE, e.g., TEFLON tape, spray-on TEFLON coating, polyester, or other material capable of withstanding the heat from the sealing element and transferring the same to the film web in an amount sufficient to create the longitudinal seals 74. Such a heat transfer medium may be desirable in some applications in order to prevent the heating element from burning through or sticking to the film web. Sealing roller 70 may similarly include such a release layer/heat transfer medium if desired or necessary.

As shown in FIG. 5, longitudinal sealing element 86 may have a first end 88 disposed on the outer surface 84 of cylinder 82, and a second end 90 disposed on the outer surface 84. As shown, the first and second ends 88, 90 may be spaced from one another such that the sealing element 86 forms a helical pattern on the surface 84 of cylinder 78. Such helical pattern results in the angled configuration of the longitudinal seals 74 shown in FIG. 4. At the same time, the helical pattern allows for expansion and contraction of the sealing element 86 without breaking or becoming loose on surface 84, which is particularly advantageous when sealing element 86 is a resistive/heating element. Expansion and contraction of the element 86 occurs due to temperature changes in the element as it is heated up, e.g., during a warming up period after being idle, or when it is cooled down, e.g., after apparatus 10 has been turned off after a period of use.

The expansion/contraction of heating element 82 may be further accommodated by including springs 92a, b at respective ends 88, 90 of sealing element 86. The springs may be an integral part of sealing element 86, or simply connected to ends 88, 90 thereof, and may be secured internally within cylinder 82 via fasteners 94a, b as shown. Springs 92a, b may advantageously exert a tensioning force on sealing element 86, and thereby keep it taught on surface 84 regardless of whether the element is in an expanded or contracted state. The springs 92a, b may be contained within grooves (not shown) in the sides of cylinder 82. Slots 96a, b may be included to provide a passage for sealing element 86 between the interior of the cylinder and surface 84 thereof as shown.

In some embodiments, the cylinder 82 and sealing element 86 of second rotary sealing device 24 may be removable and replaceable as an integral unit. In this manner, when sealing element 86 becomes worn, the entire sealing roller 80 may be manually removed and replaced with a fresh sealing roller without the need to remove a worn sealing element 86 and install a new one on cylinder 82. This feature thus facilitates the serviceability of apparatus 10 for the end-user.

Sealing roller 80 may be removably attached to apparatus 10 in any suitable manner. For example, the sealing roller may be attached to a rotatable hub (not shown) via retaining pins 100 on sealing roller 80, which may be retained in the hub via friction fit, to provide mechanical attachment of the sealing roller to the hub. When sealing element 86 is a wire or other device that generates heat by providing resistance to the flow of electrical current therethrough, retaining pins 100 may also be electrically conductive and connected to the sealing element 86, and thereby provide electrical communication between a source of electricity and the heating element. As noted above, a suitable type of pin in this regard is known as a "banana plug." Thus, for example, a carbon-brush commutator/slip-ring combination (not shown) may be used to transfer electricity from a static source, e.g., wires from a wall socket or other source, to the sealing roller 80.

Further details regarding sealing roller 80, as an alternative component of second sealing device 24, are disclosed in the above-incorporated U.S. Ser. No. 11/099,289, published under Publication Number US-2006-0218880-A1.

Figure 18:
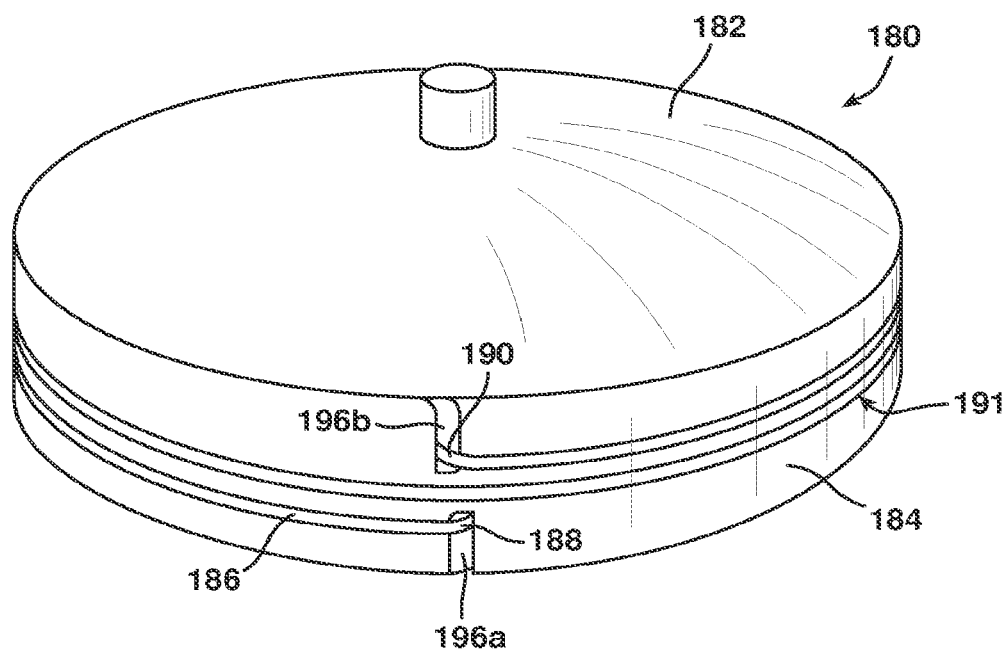
FIG. 18 is a perspective view of an alternative longitudinal sealing roller, which includes a sealing element having a double helical pattern.

As a further alternative, the longitudinal sealing element may be arranged on the sealing roller as an overlapping helical pattern, e.g., as a 'double helix.' That is, whereas longitudinal sealing element 86 is coiled once around the circumferential surface 84 of cylinder 82 to form a 'single helix,' in this alternative embodiment, the longitudinal sealing element may be coiled more than once, i.e., overlapped, about the support cylinder, e.g., to form a double helical pattern. Such an arrangement is shown in FIG. 18, which depicts alternative sealing roller 180. Sealing roller 180 includes a longitudinal sealing element 186, which is double wound, i.e., coiled twice, about the outer, circumferential surface 184 of rotatable support cylinder 182. In other embodiments, the sealing element may be coiled two or more times about the outer surface of the cylinder to form at least a double helical pattern.

The longitudinal sealing element 186 may be secured to cylinder 182, and be supplied with electrical current, in the same manner as described above relative to sealing roller 80, i.e., with internal springs (not shown) to secure the end portions 188, 190 of the sealing element, and spaced apart slots 196a, b to provide passageways for the end portions 188, 190 to traverse between the interior of the cylinder 182 and outer, circumferential surface 184 thereof. Moreover, a groove 191 may be provided in outer surface 184 to accommodate sealing element 186 and maintain it in a desired position on the outer surface of cylinder 182.

Figure 19:
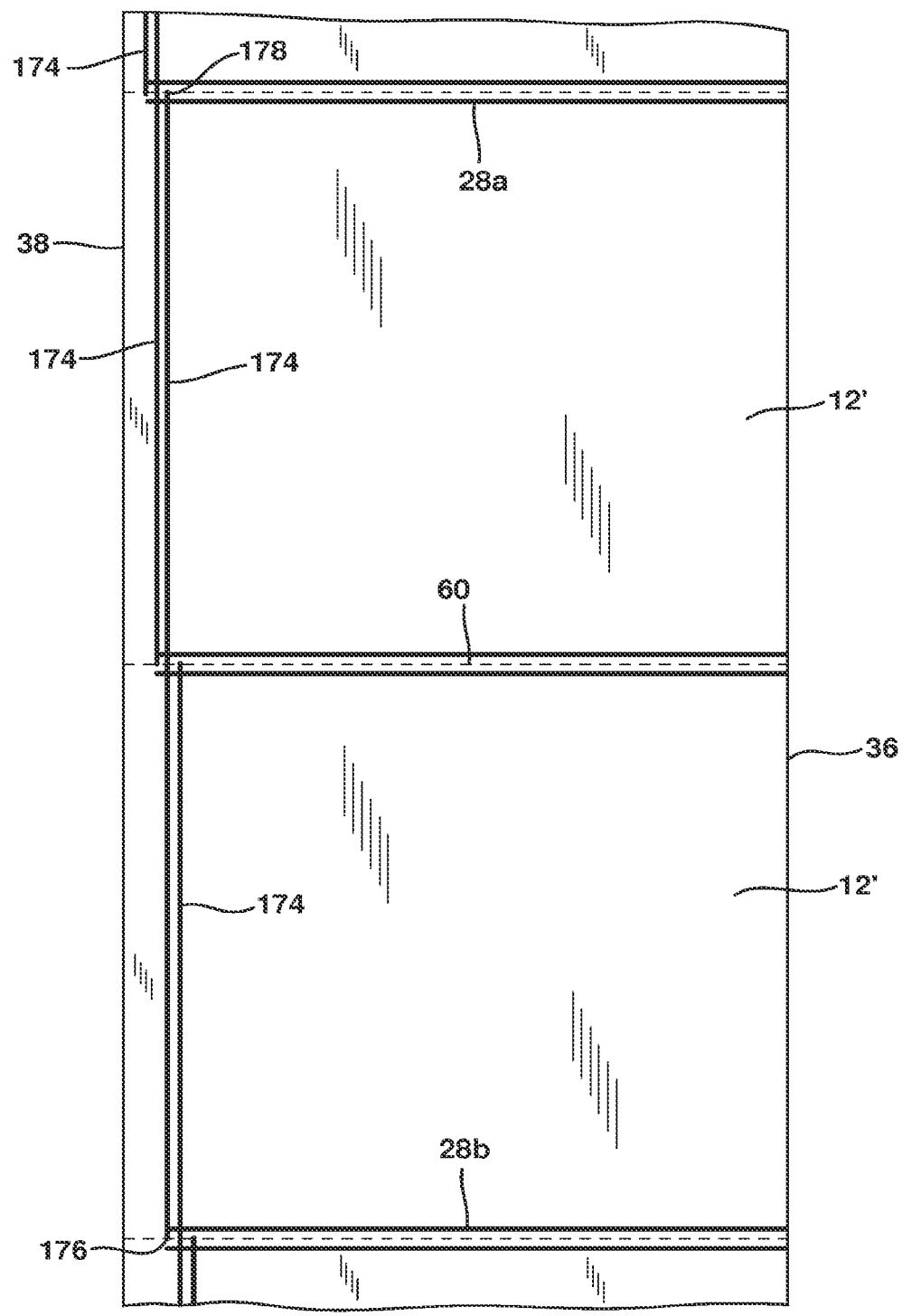
FIG. 19 is a plan view of inflated containers having a longitudinal seal formed by the sealing roller shown in FIG. 18.

As with sealing roller 80, sealing roller 180 may be synchronized with first sealing device 20 so that the resultant discontinuous longitudinal seals intersect the transverse seals 28a, b to enclose the gas within the resultant inflated containers. FIG. 19 is a plan view of two adjacent inflated containers 12', which have been sealed closed with discontinuous longitudinal seals 174 by sealing roller 180 (intermediate seals 40 have been omitted for clarity). In this embodiment, the longitudinal sealing element 186 has sufficient length, and sealing roller 180 is appropriately synchronized with first sealing device 20, such that each longitudinal seal 174 produced seals closed two adjacent inflated containers 12'. For each seal 174 produced, the leading end 176 intersects the 'downstream' transverse seal 28b of each container while the trailing end 178 intersects the 'upstream' transverse seal 28a of each container (in FIG. 19, only one complete seal 174 is shown; the remaining seals 174 are partially shown). Because of the double wound configuration of longitudinal sealing element 186, each longitudinal seal 174 is partially overlapped by preceding and succeeding longitudinal seals, such that each container 12' is sealed closed by a pair of substantially parallel longitudinal seals 174 as shown. As may thus be appreciated, the overlapping, e.g., double-wound, helical pattern of longitudinal sealing element 186 provides redundant longitudinal seals, which may lead to a higher total percentage of non-leaking inflated containers.

Figure 20:
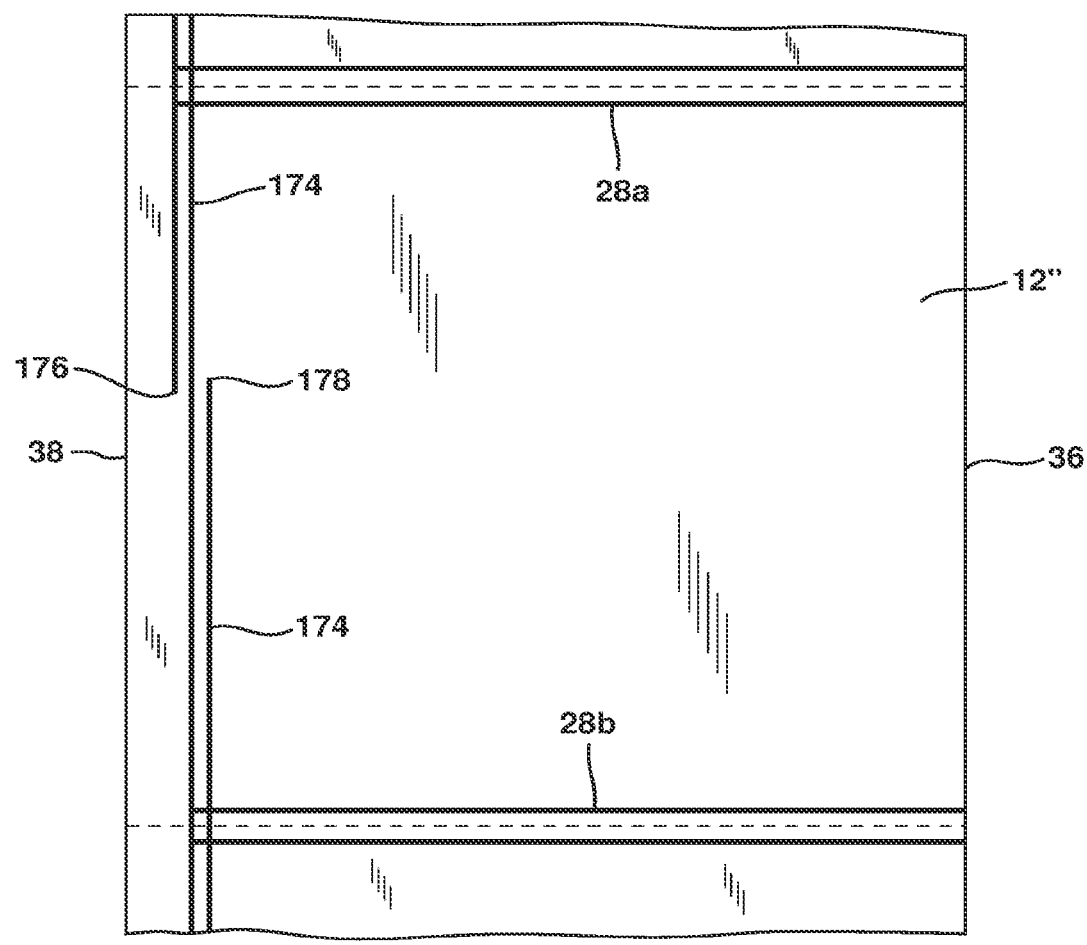
FIG. 20 is a plan view of inflated containers having a longitudinal seal formed by an alternative synchronization of the sealing roller shown in FIG. 18.

FIG. 20 illustrates an alternate longitudinal seal pattern that may result from a lack of synchronization between sealing roller 180 and first sealing device 20, such that the leading and trailing ends 176, 178 of the longitudinal seals 174 are formed between the transverse seals 28a, b of the resultant inflated containers 12". While still producing an intersection between transverse seals 28a, b and longitudinal seals 174 to enclose gas between the film plies, this alternative seal pattern advantageously does not require synchronization between the first and second sealing devices. Thus, while the seal pattern shown in FIG. 20 does not provide the redundancy of the seal pattern of FIG. 19, the non-synchronization between the first and second sealing devices may allow for a simplified set-up of apparatus 10.

Yet another alternative sealing roller that may be used in second sealing device 24 is a type of device known as a "drag sealer," which includes a stationary heating element that is placed between a pair of rotating nip rollers and in direct contact with a pair of moving film plies to create a continuous longitudinal seal. Such devices are disclosed, e.g., in U.S. Pat. Nos. 6,550,229 and 6,472,638, the disclosures of which are hereby incorporated herein by reference.

A further alternative sealing device which may be used for second rotary sealing device 24 is a type of device known as a "band sealer," which includes a pair of sealing bands that counter-rotate against one another around a plurality of guide rollers, with a heating element in contact with the inner track of one or both bands. A pair of film plies move between, and are sealed together by, the bands. Such devices are disclosed, e.g., in U.S. Ser. No. 10/979,583, filed Nov. 2, 2004 and published under publication number US-2006-0090421-A1, the disclosure of which is hereby incorporated herein by reference.

Backing rollers 38 and 68 may both be formed from a pliant material, such as, e.g., rubber or RTV silicone. Other materials, e.g., metal rollers with a knurled surface, may also be used as desired.

Intermediate sealing elements 26, transverse sealing elements 46, and longitudinal sealing element 86 may comprise one or more wires made from metal or other electrically conductive material; one or more metallic ribbons; circuit-printed plastic ribbons, e.g., metal printed on a plastic substrate comprising polyethylene terephthalate (PET); and other suitable electrically conductive devices. Examples of suitable metallic materials include, e.g., nichrome, steel, copper, etc. When sealing elements 26, 46, and 86 are in the form of a wire or ribbon, it may have any desired cross-sectional shape, including round, square, oval, rectangular, etc. Sealing elements 26, 46, and 86 may be made by any conventional method. One method that has been found suitable is to chemically-etch a metallic sheet or plate, e.g., 316 stainless steel, into a desired pattern. Using this method, the sealing elements may each be formed from a single, continuous piece of metal.

Film web 14 may, in general, comprise any flexible material that can be manipulated by apparatus 10 to produce inflated containers as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from C3 to C20 alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very tow density polyethylene (VLDPE), and ultra-low density polyethylene (ULDPE). Various other polymeric materials may also be used such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known extrusion process by melting the component polymer(s) and extruding, coextruding, or extrusion-coating them through one or more flat or annular dies.

As noted hereinabove, apparatus 10 further includes an inflation assembly 22 for placing gas between the film plies 16, 18. Inflation assembly 22 may be any device that places gas between the film plies. In the illustrated embodiment, the inflation assembly 22 inflates containers 30 by directing a stream of gas 32 between the film plies 16, 18 and into the opening of each container at open longitudinal edge 38. Inflation assembly 22 may include a nozzle 102 from which the stream of gas 32 exits the inflation assembly, and a source 104 of such gas (see FIG. 2). Gas 32 may be, e.g., air, nitrogen, carbon dioxide, etc. Gas source 104, which is shown schematically and labeled "S" in FIG. 2, may be, e.g., compressed gas, such as from one or more tanks, from a central compressor that supplies compressed gas to an entire facility, or from a smaller compressor dedicated only to apparatus 10. Gas source 104 may also be a blower, fan, or any conventional device for supplying and/or moving gas.

As shown in FIG. 2, nozzle 102 may protrude into the open longitudinal edge 38 to effect the inflation of containers 30. This may be facilitated by adapting first sealing device 20 to make transverse seals 28 such that they extend from the closed longitudinal edge 36 and terminate a predetermined distance from the open longitudinal edge 38. In this manner, each of the juxtaposed film plies 16, 18 have flanges 106 at the open longitudinal edge that are not bonded together. As shown perhaps most clearly in FIG. 4, such flanges 106 extend along the open longitudinal edge 38. Thus, flanges 106 are longitudinally extending edge sections of film plies 16, 18 that extend beyond the ends of the transverse seals 28 and, therefore, are not bonded together, i.e., by seals 28 or any other means. Accordingly, at least a portion of the nozzle 102 may be positioned between the flanges 106 so that, as film web 14 is conveyed along its travel path through apparatus 10, the nozzle moves longitudinally between the flanges. Alternatively, if edge 38 is a closed edge, a slitter may be positioned upstream of nozzle 102 to slit such edge and thereby allow the nozzle to remain positioned between the film plies 16, 18 as shown. In both cases, nozzle 102 may remain in a fixed position while film web 14 moves continuously past the nozzle.

In other embodiments, inflation assembly 22 may direct gas between the film plies by pulling gas between the film plies, e.g., by manipulating the film plies in such a way that a slight negative pressure is created in a void space between the film plies to draw gas, e.g., air, into the void space. Further details concerning this manner of inflation are set forth in U.S. Ser. No. 11/372,684, published under Publication No. US-2006-0201960-A1, the disclosure of which is hereby incorporated herein by reference thereto. In still other embodiments, inflation assembly 22 may direct gas between the film plies by manipulating the film plies in such a way that gas at ambient pressure is simply trapped between the film plies.

Referring now to FIG. 6, one embodiment of the intermediate sealing elements 26 will be described, in such embodiment, intermediate sealing elements 26 may be secured to the surface 108 of individual insulated support members 110. Insulated support members 110 may be contained within recesses 111a in sealing roller 48 as shown, e.g., such that the surfaces 108 of the support members 110 are substantially flush with surface 56 of the sealing roller 48. Support members 110 may be secured via internal connectors 112 (only one shown), which may be positioned inside of sealing roller 48 as shown. Internal connectors 112 are in electrical communication with a source of electricity (not shown), e.g., via wire leads 114a, b, which may be connected to a pair of wires (not shown) contained within the interior of sealing roller 48. Each lead 114a, b may, in turn, be connected to a separate end of each sealing element 26. In this manner, electricity can be made to flow through each of the intermediate sealing elements 26, 26a, and 26b to form the respective intermediate seals 40, 40a, and 40b.

If desired, intermediate sealing elements 26, 26a, and 26b may be electrically connected in series in the foregoing manner such that respective intermediate seals 40, 40a, and 40b may be formed as a 'set'. An opposing 'set' of intermediate sealing elements 26c-26e may be identically contained and electrically connected in corresponding recesses 111b on the opposing side of sealing roller 48 as indicated in FIG. 6. In this manner, the set of sealing elements 26-26b may be operated independently from the set of sealing elements 26c-26e. This may be desired, e.g., to produce alternating compartmented and non-compartmented containers 12.

If further desired, transverse sealing element pair 46/46a may be operated as a 'set' while opposing transverse sealing element pair 46b/46c may be operated independently as another 'set.' Both pairs may also be operated independently from the intermediate sealing element sets. This may be accomplished by equipping sealing roller 48 with four (4) separate pairs of commutator rings (not shown), which may be spaced from and co-axial with the sealing roller, i.e., such that the commutator rings rotate about axis 58 along with the sealing roller, Each commutator ring pair may be supplied with a separate source of electricity and be in electrical communication with a separate one of the four sets of sealing elements, i.e., (1) intermediate sealing set 26-26b, (2) transverse sealing set 46/46a, (3) intermediate sealing set 26c-26e, and (4) transverse sealing set 46b/46c. This configuration allows independent control of each set of sealing elements, thereby allowing container-length to be varied as desired on a real time basis, i.e., without having to change sealing rollers, by varying the web-length between actuation of the transverse sealing elements and varying the actuation of the intermediate sealing elements accordingly.

If desired, each internal connector 112 may be used to secure and electrically connect a pair of intermediate sealing elements. Thus, opposing sealing elements 26 and 26c may be secured to the same connector 112; opposing sealing elements 26a and 26d may be secured to the same connector 112; and opposing sealing elements 26b and 26e may be secured to the same connector 112 as shown. If groups of intermediate sealing elements on the same side of sealing roller 48 are to be operated as 'sets' as described above, each sealing element in the opposing pair thereof will have a separate pair of wire leads 114, will be insulated from one another, and will be supplied with electricity by a separate set of wires inside of the sealing roller. Alternatively, the same set of wires and wire leads may be used to supply both elements in a pair if the pair is not operated independently. Thus, for example, wire leads 114a, b may be used to supply electrical current to both intermediate sealing element 26a and opposing intermediate sealing element 26d.

Figure 7:
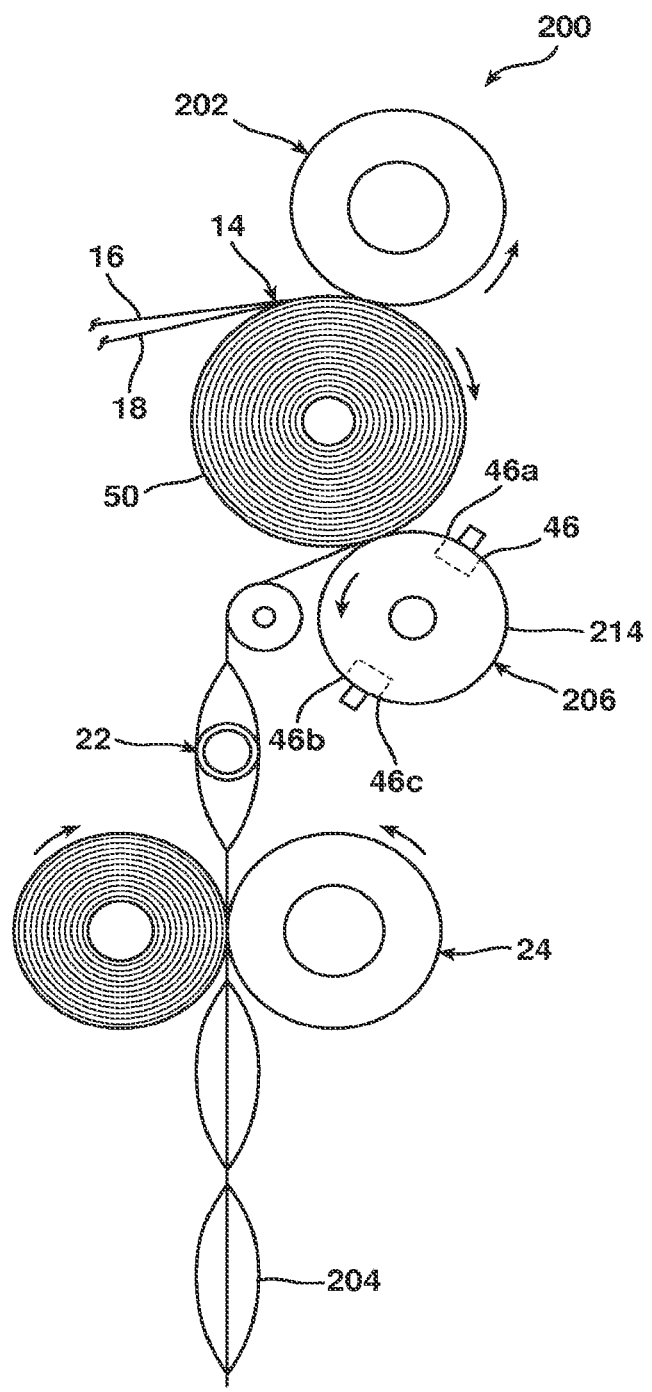
FIG. 7 is a schematic elevational view of an alternative apparatus for forming inflated containers in accordance with the present invention.

Referring now to FIGS. 7-8, another embodiment of an apparatus for making inflated containers in accordance with the present invention will be described. Such apparatus, designated by the reference numeral 200, is similar to apparatus 10, except that the intermediate sealing element is a component of a third sealing device 202, rather being a component of the first sealing device as in apparatus 10. That is, in this embodiment, the intermediate sealing element is a component of a dedicated sealing device, which produces intermediate seals independently of the first sealing device, which produces transverse seals. In the following description, where components employed in apparatus 10 may also be employed in apparatus 200 or other embodiments in accordance with the present invention, they will be indicated by the same reference number. However, this convention should not be construed as limiting in any way, as other variations are possible and entirely within the scope of the present invention.

Apparatus 200 makes inflated containers 204 from film web 14 having two juxtaposed film plies 16 and 18. As with apparatus 10, apparatus 200 includes a first sealing device 206, which produces a series of transverse seals 28 that bond the juxtaposed film plies 16, 18 together; an inflation assembly 22, which directs gas 32 between film plies 16, 18 and into pre-inflated containers 208; a second sealing device 24, which produces one or more longitudinal seals 34 that bond the film plies 16, 18 together; and at least one intermediate sealing element 210 for producing one or more intermediate seals 212 within each inflated container 204. As shown, transverse seals 28 and longitudinal seal 34 are formed in such a manner that the seals 28, 34 intersect, thereby enclosing gas 32 between film plies 16, 18.

First sealing device 206 may be substantially as shown and described with respect to FIG. 3, and may optionally include a second pair of transverse sealing members 46b and 46c as shown in FIG. 7. Thus, the first sealing device 206 may include a rotary component or sealing roller 214 which, like sealing roller 48, is adapted to bring transverse sealing elements 46-46c into rotational contact with film web 14 to form transverse seals 28 therein as the film web is conveyed along its path of travel through apparatus 200. Backing roller 50 as described above may also be employed as shown. As also described above, the sealing and backing rollers 214, 50 may thus be used to convey film web 14 through apparatus 200 when the rollers rotate in the direction indicated by the rotational arrows in FIG. 7, which thereby drives the film web in a forward direction as indicated by the linear arrow in FIG. 8.

Second sealing device 24 may produce a continuous longitudinal seal 34 as shown in FIG. 8 or, as described above, be adapted to produce a discontinuous series of longitudinal seals 74 or 174, as shown in FIGS. 4, 19 and 20, wherein each such longitudinal seal 74, 174 intersects the transverse seals 28a, b that define each pre-inflated container 208.

In the presently-illustrated embodiment, third sealing device 202 includes three intermediate sealing elements 210, 210a, and 210b, which form three columns of intermittent or discontinuous intermediate seals 212, 212a, and 212b in film web 14. As shown, the intermediate seals 212-212b partition the inflated containers 204 into two or more compartments 216a-216d, and provide at least one flow passageway 218 between compartments 216a-216d to allow such compartments to fluidly communicate with one another.

Third sealing device 202 may further include at least one rotary component, which is adapted to bring the intermediate sealing element(s) into rotational contact with film web 14 as the web is conveyed along its path of travel. In the presently-illustrated embodiment, this is accomplished by mounting the intermediate sealing elements 210-210b on individual rotatable cylinders 224-224b, respectively. Cylinders 224-224b may be independently operated or, as shown, mechanically coupled via axle 226. Alternatively, the sealing elements 210-210b may be mounted on a single roller. As shown, cylinders 224-224b with sealing elements 210-210b thereon rotate against backing roller 50 in a shared relationship with first sealing device 206. In this manner, third sealing device 202 forms the intermediate seals 212-212b as the film web is conveyed along its path of travel.

FIG. 9 illustrates one form of sealing element 210, which may be used in third sealing device 202 to make the intermediate seals 212-212b as shown in FIG. 8. Sealing element 210, and also sealing elements 210a, b, may include seal segments 220 and non-seal segments 222. When electrical current is made to flow through the sealing element, seal segments 220 heat to a temperature sufficient to form a heat seal between film plies 16, 18. In contrast, when current flows through the sealing element 210, non-seal segments 222 preferably do not heat sufficiently to form a heat seal. Thus, as the cylinders 224-224b rotate against film web 14, the film web is alternatingly contacted by a seal segment 220 and a non-seal segment 222, thereby periodically 'skipping' the formation of the intermediate seals within each column. In this manner, individual, longitudinally-spaced columns of intermediate 'skip seals' 212-212b are formed in film web 14 as shown to segment each inflated container 204 into two or more compartments 216a-216d.

Sealing elements 210-210b may be formed by chemically etching a suitable material, e.g., a piece of metal such as 316 stainless steel, in which seal segments 220 are chemically etched to be of lesser cross-sectional area, i.e., thickness, than the non-seal segments 222. The thinner seal segments 220 will thus offer greater resistance to the flow of electrical current than the thicker non-seal segments 222, and thereby heat up to a greater extent than the non-seal segments. Using this method, the sealing elements 210-210b may each be formed from a single, continuous piece of metal. Alternatively, separate pieces of material having different thicknesses and/or different electrical resistivities may be joined together to form the sealing elements with discrete seal and non-seal segments.

The sealing elements 210-210b may be joined to the outer, circumferential surface of cylinders 224-224b in the same manner as described above with respect to FIG. 5, i.e., the same way that longitudinal sealing element 86 is mounted to cylinder 82. Thus, each sealing element 210-210b may include a pair of springs 228, one at each end of the sealing element, with each spring terminating in a mounting eyelet 230 to allow the sealing element to be secured, e.g., internally secured, to the cylinders 224.

Figure 10:
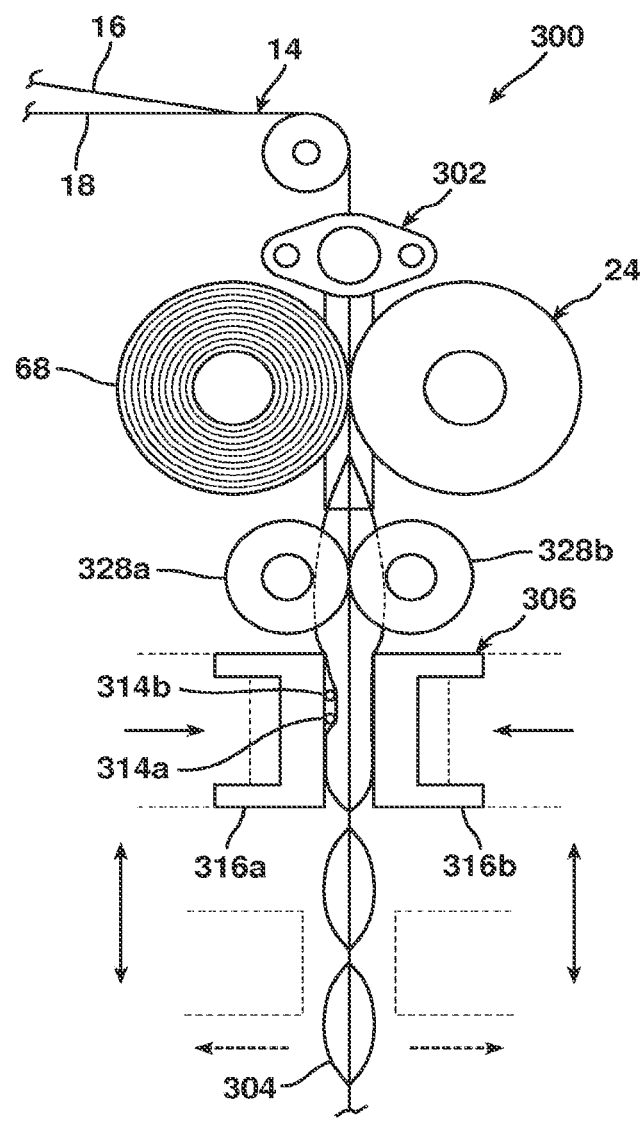
FIG. 10 is a schematic elevational view of another alternative apparatus for forming inflated containers in accordance with the present invention.
Figure 11:
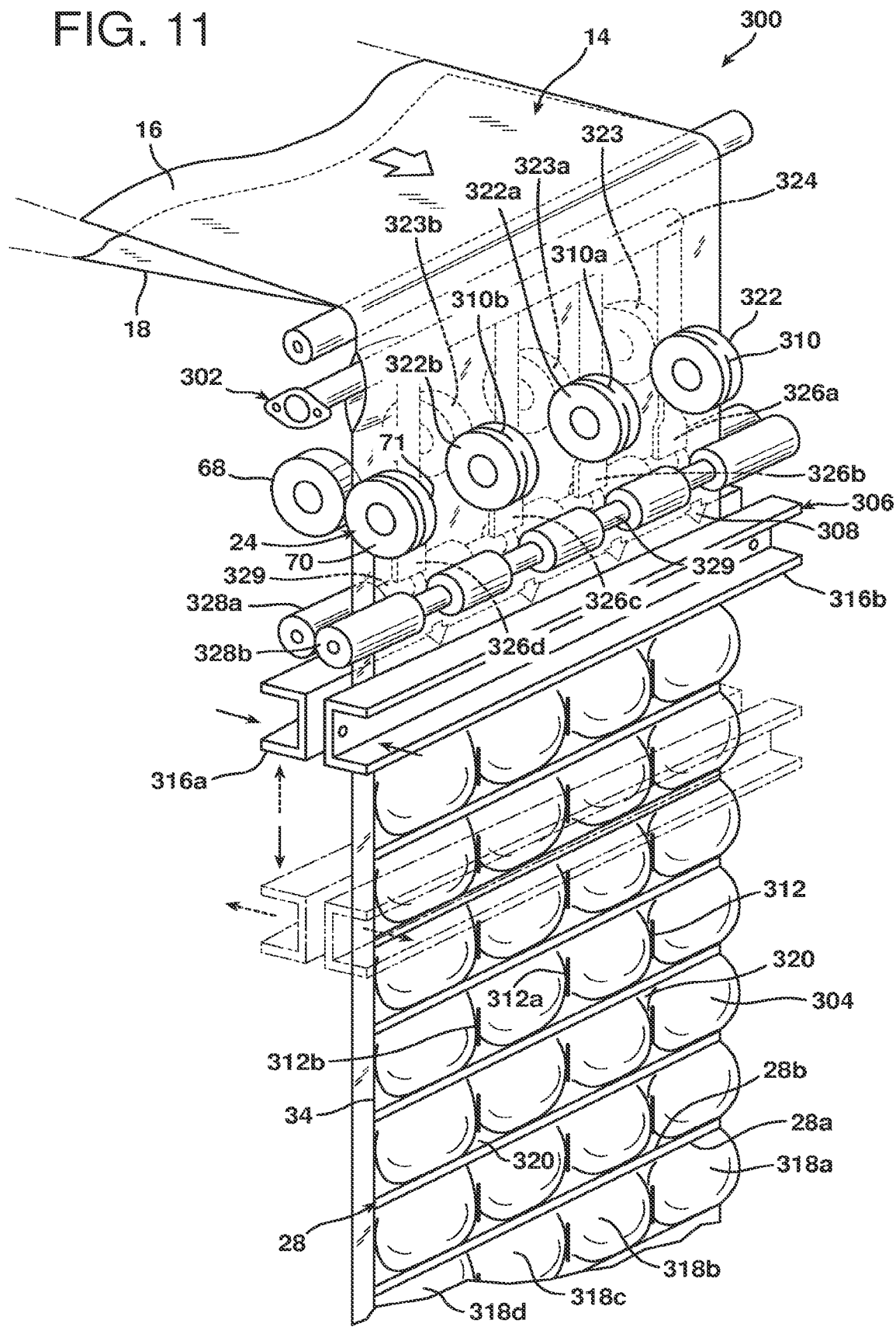
FIG. 11 is a perspective view of the apparatus shown in FIG. 10.
Figure 12:
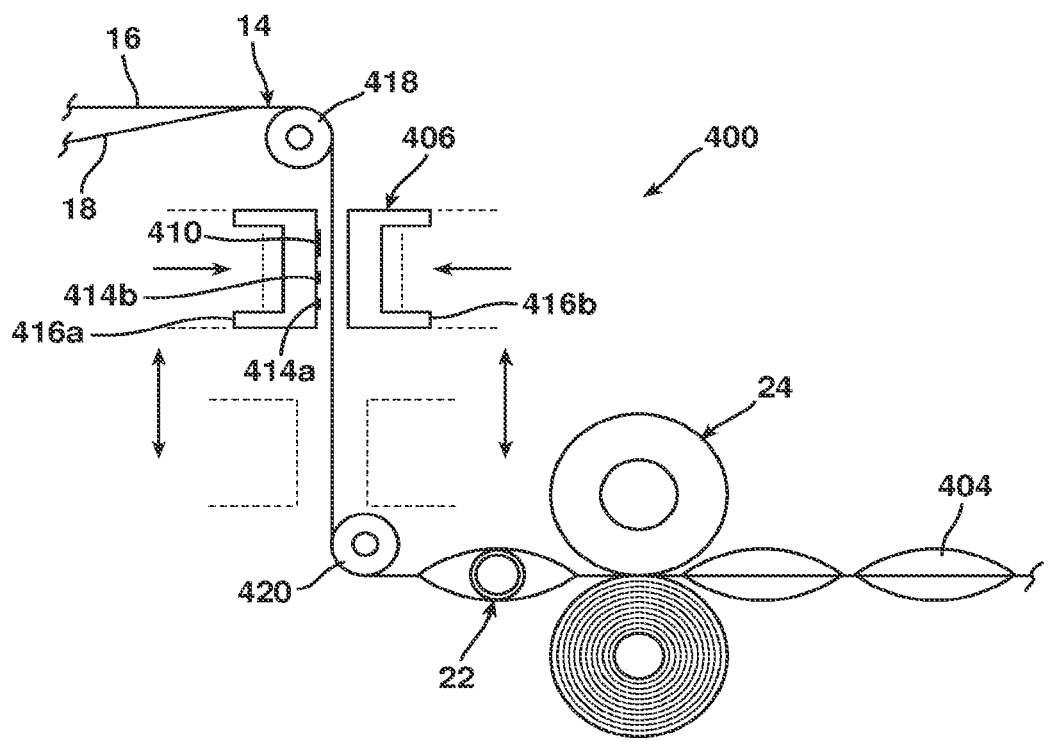
FIG. 12 is a schematic elevational view of a further alternative apparatus for forming inflated containers in accordance with the present invention.

Referring now to FIGS. 10-11, another embodiment of an apparatus for making inflated containers in accordance with the present invention will be described. Such apparatus, designated by the reference numeral 300, makes inflated containers 304 from film web 14 or any other film having two juxtaposed film plies, e.g., plies 16 and 18. Apparatus 300 includes a first sealing device 306, which produces a series of transverse seals 28 that bond the juxtaposed film plies 16, 18 together; an inflation assembly 302, which directs gas 308 between film plies 16, 18; a second sealing device 24, which produces one or more longitudinal seals 34 that bond the film plies 16, 18 together; and at least one intermediate sealing element 310 for producing one or more intermediate seals 312 within each inflated container 304. As shown, transverse seals 28 and longitudinal seal 34 are formed in such a manner that the seals 28, 34 intersect, thereby enclosing gas 308 between film plies 16, 18.

In this embodiment, first sealing device 306 comprises at least one transverse sealing element 314, e.g., a pair of transverse sealing elements 314a, b, and a movable component 316, e.g., a pair of movable components 316a, b. Movable components 316a, b are adapted to bring the transverse sealing elements 314a, b into contact with film web 14, and move with the film web along at least part of its path of travel through apparatus 300. In this manner, the first sealing device 306 forms transverse seals 28, e.g., as a pair of transverse seals 28a, b, as the film web 14 is conveyed along its path of travel, thereby forming the transversely-oriented boundaries of each inflated container 304.

As illustrated, movable components 316a, b may be positioned adjacent opposing surfaces of film web 14, and be movable towards one another as indicated by the horizontal arrows such that they engage the film web on opposing surfaces thereof. This causes movable component 316a to bring transverse sealing elements 314a, b into contact with film web 14 to form respective transverse seals 28a, b. Movable component 316b serves as a backing or support surface, against which film web 14 is pressed by component 316a and sealing elements 314a, b, to facilitate the formation of the transverse seals 28a, b. As the transverse seals 28 are being formed in this manner, the movable components 316a, b move with film web 14 along its path of travel, e.g., in a downward direction as indicated. Such movement can occur by the mere fact that the first sealing device 306 is engaged with, i.e., temporarily attached to, the film web. Alternatively or in addition, a separate conveyance mechanism for the first sealing device 306 may be employed to effect such movement.

When a sufficient amount of contact time has elapsed for the transverse seals 28 to form, the movable components 316a, b may be made to move apart to disengage from the film web, as indicated by the phantom, divergent arrows in FIGS. 10-11. At this point, the movable components 316a, b will be downstream of their starting position, at an ending position which is also shown in phantom. A suitable means of conveyance (not shown), e.g., a chain-drive, pneumatic-drive, hydraulic-drive, or screw-drive mechanism, may be used to move the movable components 316a, b back upstream to their starting position. The movable components 316a, b may then be made to re-engage film web 14 at any desired time to produce the next set 28a, b of transverse seals, thereby producing inflated containers of any desired length.

Accordingly, container-size can thus be varied as desired without having to change film rolls, and with no sacrifice in production speed since the first sealing device 306 moves with the film web. Moreover, apparatus 300 can produce inflated containers of varying length, such that two or more adjacent containers in the film web have different lengths. In this manner, relatively complex cushions comprising two or more inflated containers of two or more different sizes can be produced.

Any suitable mechanism may be employed to cause movable components 316a, b to converge toward and diverge away from one another, e.g., a pair of actuators (not shown) that may be powered pneumatically, hydraulically, electrically, mechanically, magnetically, electro-magnetically, etc. Transverse sealing elements 314a, b may be heat seal elements as described above. Further details regarding the first sealing device 306 are disclosed in the above-incorporated U.S. Ser. No. 10/979,583, filed Nov. 2, 2004 and published under publication number US-2006-0090421-A1.

Second sealing device 24 may produce a continuous longitudinal seal 34 as shown, e.g., in FIG. 2 or, if desired, produce a discontinuous series of longitudinal seals 74 or 174 which, as shown in FIGS. 4, 19, and 20, intersect the transverse seals 28a, b of each inflated container. For simplicity, a continuous longitudinal seal 34 is shown in FIG. 11.

In this embodiment, three intermediate sealing elements 310, 310a, and 310b are illustrated, which produce three corresponding columns of intermediate seals 312, 312a, and 312b. As shown, each column of intermediate seals 312-312b are in the form of discontinuous 'skip' seals, which partition the inflated containers 304 into two or more compartments 318a-318d, and provide at least one flow passageway 320 between compartments 318a-318d to allow such compartments to fluidly communicate with one another. It may be readily appreciated that a greater or lesser number of intermediate sealing elements may be employed in this and in other embodiments described herein, to produce a greater or lesser number of compartments within the inflated containers.

Intermediate sealing elements 310-310b may be identical to intermediate sealing elements 210-210b as described above. Similarly, each sealing element 310-310b may be mounted on a rotary component, e.g., individual rotatable cylinders 322-322b, which are adapted to bring the intermediate sealing elements into rotational contact with film web 14 as the web is conveyed along its path of travel. Each cylinder 322-322b may rotate against an associated backing roller 323-323b as shown.

In this embodiment, second sealing device 24 may be operated in parallel with the intermediate sealing elements 310-310b. As shown, the second sealing device 24 and intermediate sealing elements 310-310b may be positioned upstream of first sealing device 306, such that intermediate seals 312-312b and longitudinal seal 34 are formed prior to the formation of transverse seals 28. In some versions, intermediate sealing elements 310-310b may be operated independently of second sealing device 24, i.e., as a "third sealing device" as shown in FIGS. 7-8 and described above with respect to third sealing device 202. In other versions, intermediate sealing elements 310-310b may be integrated into second sealing device 24, e.g., by connecting cylinders 310-310b with cylinder 70 via a single axle such as axle 226 as shown in FIG. 8. Alternatively, intermediate sealing elements 310-310b and longitudinal sealing element 71 may all be mounted on the surface of a single elongated cylinder such as sealing roller 48 as shown in FIG. 2.

As an alternative to inflation assembly 22 as described above, which includes a relatively simple nozzle 102, inflation assembly 302 in apparatus 300 may include manifold 324 with multiple nozzles 326a-d to direct gas 308 between film plies 16, 18 in a distributed manner as shown in FIG. 11. Each nozzle 326a-d may be aligned with one of the compartments 318a-d as shown to ensure adequate gas flow to each compartment. An opposing pair of grooved nip rollers 328a, b may be included to facilitate this process by directing gas flow 308 between grooves 329 and into each compartment 318a-d. Nip rollers 328a, b may also be powered to provide a mechanism for conveying film web 14 along the indicated path of travel through apparatus 300.

Referring now to FIGS. 12-15, another embodiment of the invention will be described. In this embodiment, apparatus 400 makes inflated containers 404 from film web 14 or from any other web having two juxtaposed film plies, e.g., plies 16 and 18. Apparatus 400 includes a first sealing device 406, which produces a series of transverse seals 28 that bond the juxtaposed film plies 16, 18 together; an inflation assembly 22, which directs gas 32 between film plies 16, 18; a second sealing device 24, which produces one or more longitudinal seals 34 that bond the film plies 16, 18 together; and at least one intermediate sealing element 410 for producing one or more intermediate seals 412 within each inflated container 404. As shown, transverse seals 28 and longitudinal seal 34 are formed in such a manner that the seals 28, 34 intersect, thereby enclosing gas 32 between film plies 16, 18.

First sealing device 406 may be substantially similar to first sealing device 306 as described above and illustrated in FIGS. 10-11. Thus, first sealing device 406 may comprise at least one transverse sealing element 414, e.g., a pair of transverse sealing elements 414a, b, and a movable component 416, e.g., a pair of movable components 416a, b, with both of transverse sealing elements 414a, b mounted, e.g., on movable component 416a. Movable components 416a, b are adapted to bring the transverse sealing elements 414a, b into contact with film web 14, and move with the film web along at least part of its path of travel through apparatus 400 as shown, e.g., by moving in a reciprocating path between guide rollers 418 and 420 as shown. In this manner, the first sealing device 406 forms transverse seals 28, e.g., as a pair of transverse seals 28a, b, as the film web 14 is conveyed along its path of travel, thereby forming pre-inflated containers 408.

Figure 14A:
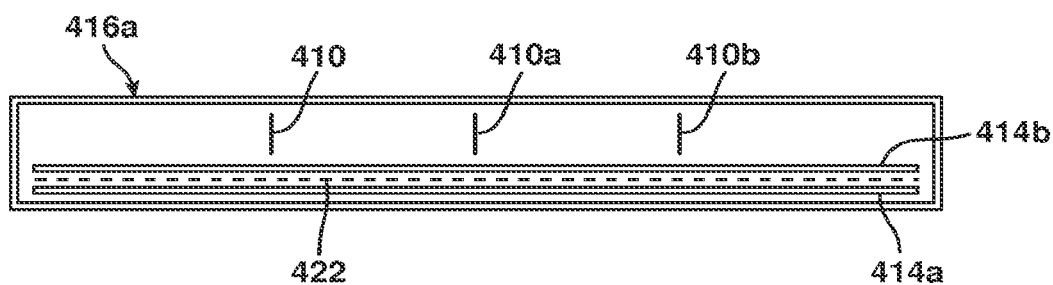
FIG. 14A is an enlarged, elevational view of component 416a of first sealing device 406 as shown in FIGS. 12-13.

Unlike first sealing device 306, first sealing device 406 is positioned upstream of the inflation assembly and second sealing device. In addition, first sealing device 406 may further comprise one or more intermediate sealing elements 410. Thus, as shown in FIG. 14A for example, movable component 416a may include transverse sealing elements 414a, b, and also intermediate sealing elements 410, 410a, and 410b. A perforation blade 422 may also be included, e.g., between transverse sealing elements 414a, b, to form lines of weakness between each container 404 (not shown).

Figure 14B:
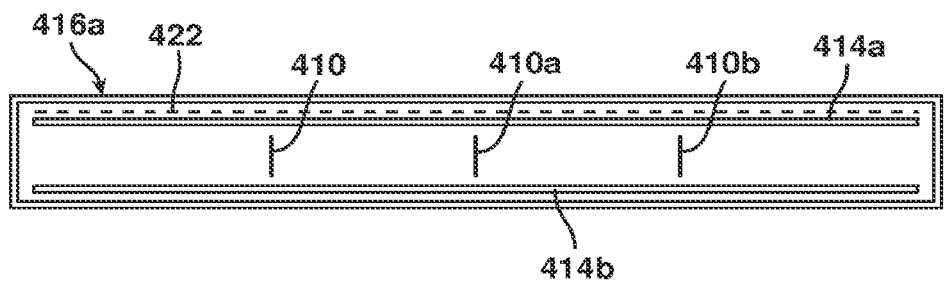
Figure 15:
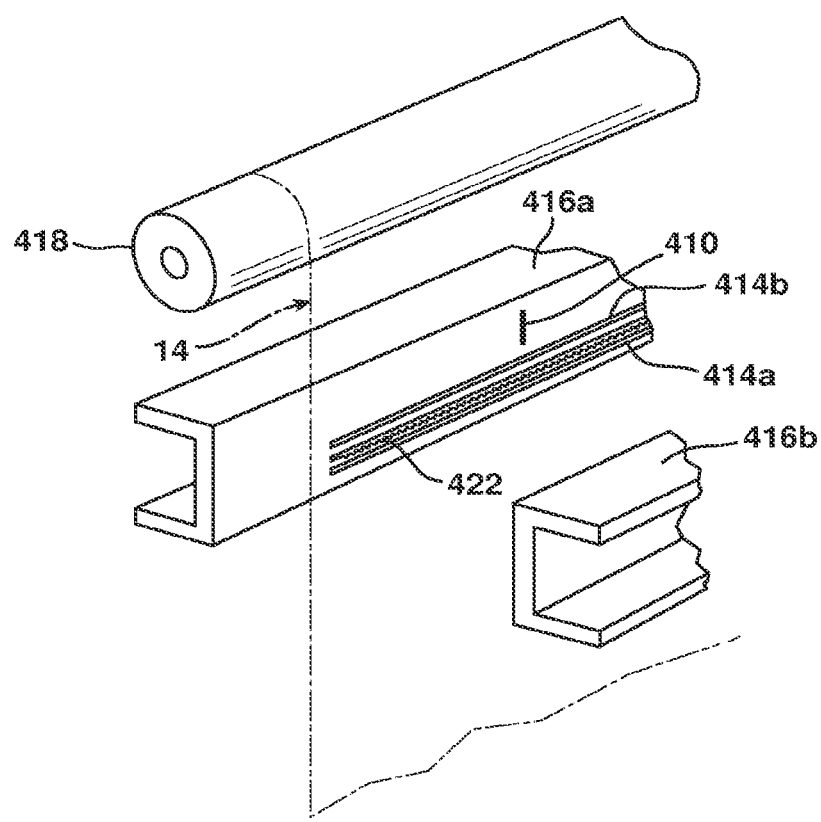
FIG. 15 is a detailed perspective view of the movable components 416a, b of first sealing device 406 as shown in FIGS. 12-13.

An alternative configuration of the transverse sealing elements 414a, b, intermediate sealing elements 410-410b, and perforation blade 422 is shown in FIG. 14B. Both configurations will result in the seal pattern shown in FIG. 13.

Accordingly, when first sealing device 406 makes contact with film web 14, movable component 416a thereof brings both the transverse sealing elements 414a, b and the intermediate sealing elements 410-410b into contact with the film web, and thereby forms both the transverse seals 28a, b and corresponding intermediate seals 412, 412a, and 412b as the film web is conveyed along its path of travel. As shown in FIG. 13, the three intermediate sealing elements 410, 410a, and 410b produce three corresponding columns of intermediate seals 412, 412a, and 412b. As shown, each column of intermediate seals 412-412b are in the form of discontinuous 'skip' seals, which partition the inflated containers 404 into two or more compartments 424a-424d, and provide at least one flow passageway 426 between compartments 424a-424d to allow such compartments to fluidly communicate with one another.

Inflation assembly 22 and second sealing device 24 may be substantially as described above. In this embodiment, second sealing device 24 provides the mechanism to convey film web 14 along the indicated path of travel through apparatus 400. Alternatively, a separate mechanism, e.g., a pair of drive rollers (not shown), may be employed for this purpose.

Figure 16:
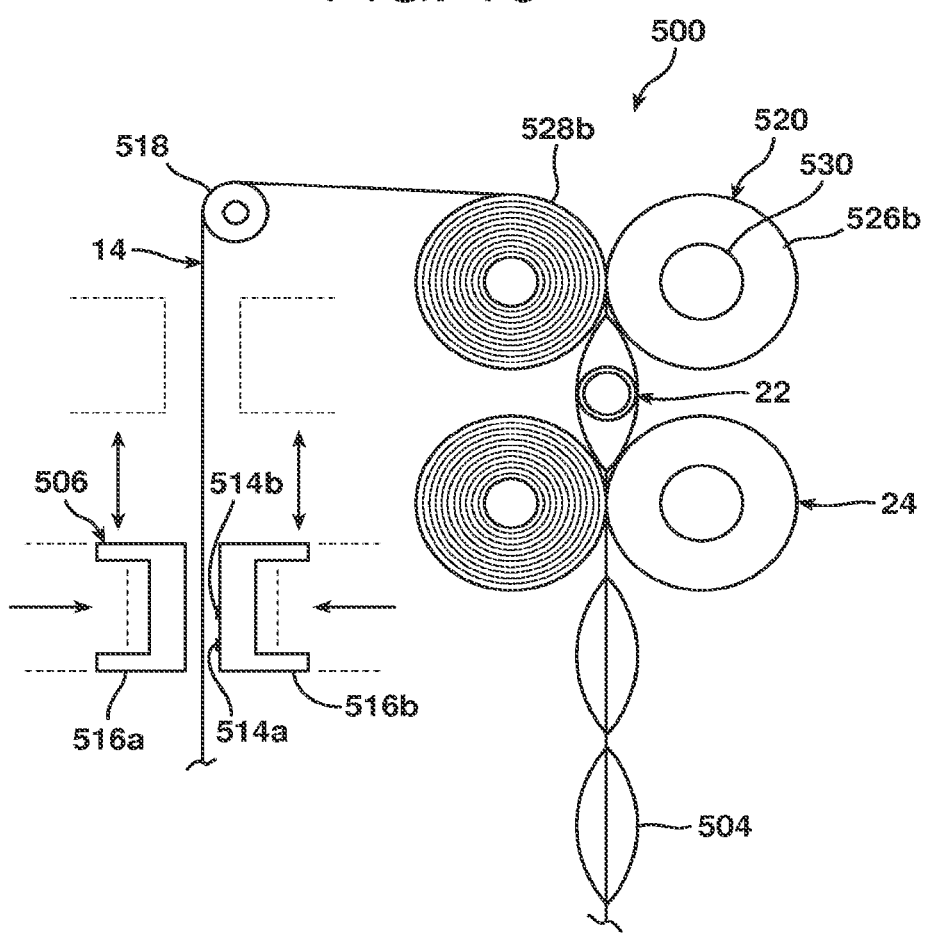
FIG. 16 is a schematic elevational view of another alternative apparatus for forming inflated containers in accordance with the present invention.
Figure 17:
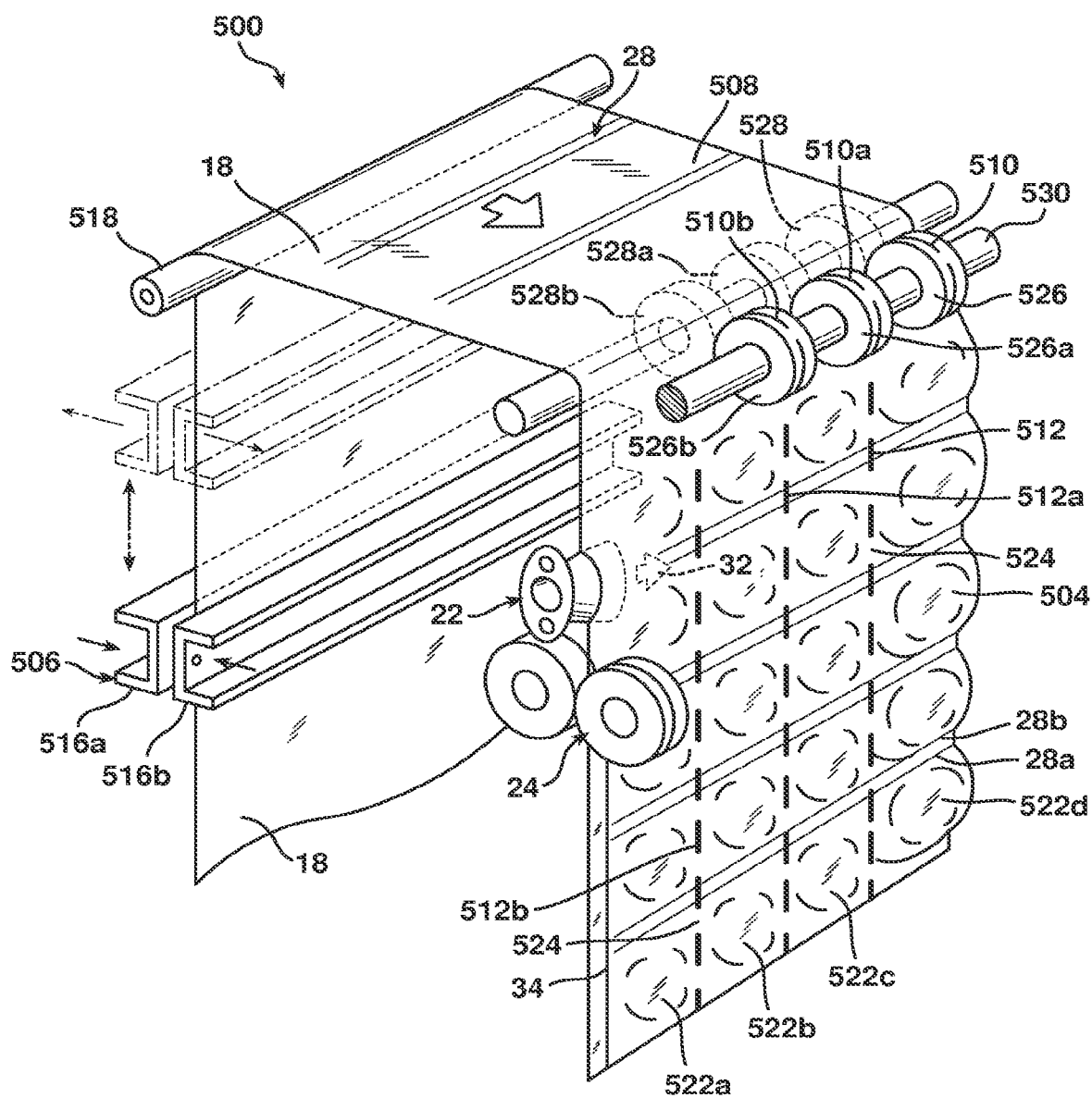
FIG. 17 is a perspective view of the apparatus shown in FIG. 16.

Referring now to FIGS. 16-17, yet another embodiment of the present invention will be described. In this embodiment, apparatus 500 makes inflated containers 504 from film web 14 or any other film having two juxtaposed film plies, e.g., plies 16 and 18. Apparatus 500 includes a first sealing device 506, which produces a series of transverse seals 28 that bond the juxtaposed film plies 16, 18 together; an inflation assembly, such as inflation assembly 22 as described above, which directs gas 32 between film plies 16, 18; a second sealing device, such as second sealing device 24 as described above, which produces one or more longitudinal seals 34 that bond the film plies 16, 18 together; and at least one intermediate sealing element 510 for producing one or more intermediate seals 512 within each inflated container 504. Transverse seals 28 and longitudinal seal 34 are formed in such a manner that the seals 28, 34 intersect, thereby enclosing gas 32 between film plies 16, 18.

First sealing device 506 may be substantially similar to first sealing device 306 as described above and illustrated in FIGS. 10-11. In apparatus 500, however, first sealing device 506 is positioned upstream of the inflation assembly and second sealing device. First sealing device 506 may include at least one transverse sealing element 514, e.g., a pair of transverse sealing elements 514a, b, and a movable component 516, e.g., a pair of movable components 516a, b, with both of transverse sealing elements 514a, b mounted, e.g., on movable component 516b. Movable components 516a, b are adapted to bring the transverse sealing elements 514a, b into contact with film web 14, and move with the film web along at least part of its path of travel through apparatus 500, e.g., by moving in a reciprocating path upstream of guide roller 518 as shown. In this manner, the first sealing device 506 forms transverse seals 28, e.g., as a pair of transverse seals 28a, b, as the film web 14 is conveyed along its path of travel, thereby forming pre-inflated containers 508.

Second sealing device 24 may produce a continuous longitudinal seal 34 as shown in FIG. 17 or, as described above, be adapted to produce a discontinuous series of longitudinal seals 74 or 174, as shown in FIGS. 4, 19, and 20, wherein each such longitudinal seal 74, 174 intersects the transverse seals 28a, b that define each pre-inflated container 508.

As with apparatus 200 described above in connection with FIGS. 7-9, the intermediate sealing element 510 employed in apparatus 500 is a component of a third sealing device 520. As shown, third sealing device 520 includes, in addition to sealing element 510, intermediate sealing elements 510a and 510b, which form three columns of intermittent or discontinuous intermediate seals 512, 512a, and 512b in film web 14. Such intermediate seals 512-512b partition the inflated containers 504 into two or more compartments 522a-522d, and provide at least one flow passageway 524 between compartments 522a-522d to allow such compartments to fluidly communicate with one another.

Third sealing device 520 may further include at least one rotary component, which is adapted to bring the intermediate sealing element(s) into rotational contact with film web 14 as the web is conveyed along its path of travel. In the presently-illustrated embodiment, this is accomplished by mounting the intermediate sealing elements 510-510b on individual rotatable cylinders 526-526b, respectively. Cylinders 526-526b may be independently operated or, as shown, mechanically coupled with a common axle 530. Alternatively, the sealing elements 510-510b may be mounted on a single roller. As shown, cylinders 526-526b with sealing elements 510-510b thereon rotate against individual backing rollers 528-528b. In this manner, third sealing device 520 forms the intermediate seals 512-512b as the film web is conveyed along its path of travel.

As shown, second sealing device 24 and/or third sealing device 520 may constitute a mechanism to convey film web 14 along the indicated path of travel through apparatus 500.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. An apparatus for forming inflatable containers in a film web having two juxtaposed film plies, the apparatus comprising:
   a transverse sealing device configured to produce a series of transverse seals in the film web to bond the juxtaposed film plies together; and
   an intermediate sealing device configured to produce a plurality of columns of discontinuous intermediate seals in the film web;
   wherein the transverse seals form sides of inflatable containers in the film web and the film web has a closed longitudinal edge that forms a closed end of the inflatable containers;
   wherein the intermediate seals are arranged to partition each inflatable container into a plurality of compartments;
   wherein, in each of the inflatable containers, the intermediate seals provide at least one flow passageway between compartments to allow the compartments to fluidly communicate with one another.

2. The apparatus of claim 1, wherein the transverse sealing device is further configured to produce a series of pairs of transverse seals in the film web.

3. The apparatus of claim 2, wherein the transverse sealing device is further configured to form a line of weakness between each of the pairs of transverse seals in the film web.

4. The apparatus of claim 1, wherein the intermediate sealing device is configured to produce the plurality of columns of discontinuous intermediate seals in the film web such that the intermediate seals do not intersect the transverse seals.

5. The apparatus of claim 1, wherein the intermediate sealing device is configured to produce the plurality of columns of discontinuous intermediate seals in the film web such that a first set of the intermediate seals intersect the transverse seals.

6. The apparatus of claim 5, wherein the intermediate sealing device is configured to produce the plurality of columns of discontinuous intermediate seals in the film web such that a second set of the intermediate seals do not intersect the transverse seals.

7. The apparatus of claim 1, wherein the film web is configured to move along a path of travel through the apparatus, and wherein the intermediate sealing device is upstream of the transverse sealing device along the path of travel.

8. A method of forming inflatable containers in a film web having two juxtaposed film plies, the method comprising:
   producing, by a transverse sealing device, a series of transverse seals in the film web to bond the juxtaposed film plies together; and
   producing, by an intermediate sealing device, a plurality of columns of discontinuous intermediate seals in the film web;
   wherein the transverse seals form sides of inflatable containers in the film web and the film web has a closed longitudinal edge that forms a closed end of the inflatable containers;
   wherein the intermediate seals are arranged to partition each inflatable container into a plurality of compartments;
   wherein, in each of the inflatable containers, the intermediate seals provide at least one flow passageway between compartments to allow the compartments to fluidly communicate with one another.

9. The method of claim 8, wherein producing the transverse seals comprises producing a series of pairs of transverse seals in the film web.

10. The method of claim 9, wherein producing the transverse seals further comprises forming a line of weakness between each of the pairs of transverse seals in the film web.

11. The method of claim 8, wherein producing the plurality of columns of discontinuous intermediate seals in the film web comprises producing the intermediate seals such that the intermediate seals do not intersect the transverse seals.

12. The method of claim 8, wherein producing the plurality of columns of discontinuous intermediate seals in the film web comprises producing the intermediate seals such that a first set of the intermediate seals intersect the transverse seals.

13. The method of claim 12, wherein the intermediate sealing device is configured to produce the plurality of columns of discontinuous intermediate seals in the film web such that a second set of the intermediate seals do not intersect the transverse seals.

14. The method of claim 8, wherein producing the plurality of columns of discontinuous intermediate seals in the film web is performed in before producing the series of transverse seals in the film web.

* * * * *